US008186820B2

(12) United States Patent
Chiwata

(10) Patent No.: US 8,186,820 B2
(45) Date of Patent: May 29, 2012

(54) IMAGE FORMING METHOD AND APPARATUS

(75) Inventor: Yuhei Chiwata, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 538 days.

(21) Appl. No.: 12/410,252

(22) Filed: Mar. 24, 2009

(65) Prior Publication Data

US 2009/0244146 A1 Oct. 1, 2009

(30) Foreign Application Priority Data

Mar. 25, 2008 (JP) ................................ 2008-078335

(51) Int. Cl.
*C09D 11/00* (2006.01)

(52) U.S. Cl. .................................... 347/100; 106/31.13

(58) Field of Classification Search .................. 347/100; 106/31.13

See application file for complete search history.

(56) References Cited

U.S. PATENT DOCUMENTS

| | | | | |
|---|---|---|---|---|
| 5,623,296 | A | 4/1997 | Fujino et al. | |
| 5,764,263 | A * | 6/1998 | Lin | 347/101 |
| 5,997,136 | A | 12/1999 | Fujisawa et al. | |
| 6,196,674 | B1 * | 3/2001 | Takemoto | 347/103 |
| 6,443,568 | B1 * | 9/2002 | Askeland et al. | 347/98 |
| 2004/0021757 | A1 * | 2/2004 | Shastry et al. | 347/106 |

FOREIGN PATENT DOCUMENTS

| | | | |
|---|---|---|---|
| EP | 0 876 914 | A1 | 11/1998 |
| JP | 2003-48317 | A | 2/2003 |
| JP | 2007-160839 | A | 6/2007 |
| WO | WO-94/01283 | A1 | 1/1994 |
| WO | WO 2006083000 | A1 * | 8/2006 |

* cited by examiner

*Primary Examiner* — Laura Martin

(74) *Attorney, Agent, or Firm* — Birch, Stewart, Kolasch & Birch, LLP

(57) ABSTRACT

The image forming method forms an image on a medium by using ink and treatment liquid. The ink contains coloring material and thermoplastic resin particles in a solvent, and the treatment liquid contains a component which aggregates the coloring material. The image forming method includes: a treatment liquid deposition step of depositing the treatment liquid onto the medium to form a treatment liquid film on the medium; an ink droplet deposition step of ejecting and depositing droplets of the ink onto the medium to form an ink film on the medium on which the treatment liquid film has been formed; and an ink film drying step of heating and drying the ink film under conditions where T<MFT+20° C. until α declines to a state not higher than 2.0 from a state exceeding 2.0, where T is a surface temperature of the ink film, MFT is a minimum film forming temperature of the thermoplastic resin particles, and α is a solvent content rate of the ink film formed on the medium in the ink droplet deposition step defined as a volume of the solvent per unit surface area in the ink film divided by a volume of solid material per unit surface area in the ink film.

6 Claims, 13 Drawing Sheets

FIG.6

| EXPERIMENT | MFT | TREATMENT LIQUID DRYING | INK DRYING (HEATER/HOT AIR FLOW) | T ($\alpha$=2.0) | T(dry) | IMAGE DEFORMATION | DRYING DURATION | IMAGE LUSTER |
|---|---|---|---|---|---|---|---|---|
| EXAMPLE 1 | 35°C | 40°C×2s | 25°C/25°C | 20°C | 25°C | EXCELLENT | 13.0 s | FAIR |
| EXAMPLE 2 | 35°C | 40°C×2s | 30°C/30°C | 24°C | 30°C | EXCELLENT | 10.0 s | FAIR |
| EXAMPLE 3 | 35°C | 40°C×2s | 40°C/40°C | 32°C | 40°C | EXCELLENT | 8.5 s | GOOD |
| EXAMPLE 4 | 35°C | 40°C×2s | 50°C/50°C | 40°C | 50°C | GOOD | 7.2 s | GOOD |
| EXAMPLE 5 | 35°C | 40°C×2s | 60°C/60°C | 50°C | 60°C | GOOD | 6.0 s | GOOD |
| EXAMPLE 6 | 35°C | 40°C×2s | 65°C/65°C | 55°C | 65°C | FAIR | 5.5 s | GOOD |
| COMPARATIVE EXAMPLE 1 | 35°C | 40°C×2s | 70°C/70°C | 63°C | 70°C | POOR | 5.0 s | GOOD |
| COMPARATIVE EXAMPLE 2 | 35°C | 40°C×2s | 80°C/80°C | 67°C | 80°C | POOR | 4.2 s | GOOD |
| EXAMPLE 7 | 50°C | 40°C×2s | 30°C/30°C | 27°C | 30°C | EXCELLENT | 10.0 s | FAIR |
| EXAMPLE 8 | 50°C | 40°C×2s | 40°C/40°C | 32°C | 40°C | EXCELLENT | 8.5 s | GOOD |
| EXAMPLE 9 | 50°C | 40°C×2s | 50°C/50°C | 40°C | 50°C | EXCELLENT | 7.2 s | GOOD |
| EXAMPLE 10 | 50°C | 40°C×2s | 70°C/70°C | 63°C | 70°C | GOOD | 5.0 s | GOOD |
| EXAMPLE 11 | 50°C | 40°C×2s | 80°C/80°C | 67°C | 80°C | GOOD | 4.2 s | GOOD |
| EXAMPLE 12 | 50°C | 40°C×2s | 85°C/85°C | 70°C | 85°C | FAIR | 3.4 s | GOOD |
| COMPARATIVE EXAMPLE 3 | 50°C | 40°C×2s | 90°C/90°C | 74°C | 90°C | POOR | 2.9 s | GOOD |
| COMPARATIVE EXAMPLE 4 | 50°C | 40°C×2s | 95°C/95°C | 79°C | 95°C | POOR | 2.2 s | GOOD |

FIG.9

| EXPERIMENT | MFT | TREATMENT LIQUID DRYING | INK DRYING (HEATER/HOT AIR FLOW) | T(α=2.0) | T(dry) | IMAGE DEFORMATION | DRYING DURATION | IMAGE LUSTER |
|---|---|---|---|---|---|---|---|---|
| EXAMPLE 13 | 35°C | NO | 30°C/30°C | 24°C | 30°C | GOOD | 12.0 s | FAIR |
| EXAMPLE 14 | 35°C | NO | 40°C/40°C | 32°C | 40°C | GOOD | 10.6 s | GOOD |
| EXAMPLE 15 | 35°C | NO | 50°C/50°C | 40°C | 50°C | FAIR | 9.2 s | GOOD |
| EXAMPLE 16 | 35°C | NO | 60°C/60°C | 50°C | 60°C | FAIR | 8.1 s | GOOD |
| EXAMPLE 17 | 35°C | NO | 65°C/65°C | 55°C | 65°C | FAIR | 7.5 s | GOOD |
| COMPARATIVE EXAMPLE 5 | 35°C | NO | 70°C/70°C | 63°C | 70°C | POOR | 7.1 s | GOOD |
| COMPARATIVE EXAMPLE 6 | 35°C | NO | 80°C/80°C | 67°C | 80°C | POOR | 6.4 s | GOOD |

FIG.10

| EXPERIMENT | MFT | TREATMENT LIQUID DRYING | INK DRYING (HEATER/HOT AIR FLOW) | T ($\alpha$=2.0) | T (dry) | IMAGE DEFORMATION | DRYING DURATION | IMAGE LUSTER |
|---|---|---|---|---|---|---|---|---|
| EXAMPLE 18 | 35°C | 40°C × 2s | 35°C/35°C × 5s ↓ 65°C/65°C × 2s | 34°C | 60°C | EXCELLENT | 7.0 s | GOOD |
| EXAMPLE 19 | 35°C | 40°C × 2s | 40°C/40°C × 4s ↓ 70°C/70°C × 2s | 34°C | 60°C | EXCELLENT | 6.0 s | GOOD |
| EXAMPLE 20 | 50°C | 40°C × 2s | 60°C/60°C × 3.5s ↓ 85°C/85°C × 1.5s | 45°C | 85°C | EXCELLENT | 5.0 s | GOOD |
| EXAMPLE 21 | 50°C | 40°C × 2s | 70°C/70°C × 2s ↓ 90°C/90°C × 1s | 60°C | 90°C | EXCELLENT | 3.0 s | GOOD |

FIG.12

| EXPERIMENT | MFT | TREATMENT LIQUID DRYING | INK DRYING (HEATER/HOT AIR FLOW) | HEAT AND PRESSURE FIXING | T (dry) | T ($\alpha$=2.0) | IMAGE DEFOR-MATION | DRYING DURA-TION | IMAGE LUSTER |
|---|---|---|---|---|---|---|---|---|---|
| EXAMPLE 4 | 35°C | 40°C × 2s | 50°C/50°C | NO | 40°C | 50°C | GOOD | 7.2 s | GOOD |
| EXAMPLE 10 | 50°C | 40°C × 2s | 70°C/70°C | NO | 63°C | 70°C | GOOD | 5.0 s | GOOD |
| EXAMPLE 22 | 35°C | 40°C × 2s | 50°C/50°C | YES | 40°C | 50°C | GOOD | 7.2 s | EXCELLENT |
| EXAMPLE 23 | 50°C | 40°C × 2s | 70°C/70°C | YES | 63°C | 70°C | GOOD | 5.0 s | EXCELLENT |

IMAGE FORMING METHOD AND APPARATUS

BACKGROUND OF THE INVENTION

1. Field of the Invention

The present invention relates to an image forming method and an image forming apparatus for forming an image on a recording medium by using an ink containing coloring material and resin particles in a solvent and a treatment liquid for aggregating the coloring material.

2. Description of the Related Art

An inkjet recording system performs recording by ejecting and depositing droplets of ink onto a recording medium from a plurality of nozzles formed in an inkjet head, and such a system is able to record images of high resolution and high quality, with little noise during the recording operation and low running costs. The ink ejection system may be, for example, a piezoelectric system, which uses the displacement of a piezoelectric element, a thermal system, which uses thermal energy generated by a heating element, or the like.

In the inkjet recording system, when ink droplets are consecutively deposited in such a manner that the ink droplets (ink dots) that are mutually adjacent on the recording medium overlap with each other, these ink droplets combine together due to their surface tension and give rise to a problem of bleeding (landing interference) in which the desired dots cannot be formed. In the case of dots of the same color, the dots shape is disturbed and in the case of dots of different colors, an additional problem of color mixing occurs. In particular, when recording with a single-pass system using a line head, the difference in the landing time between mutually adjacent ink droplets is short and therefore landing interference is liable to occur and it is difficult to form a sharply defined image.

In response to this, technology is known which achieves high image quality by depositing a so-called treatment liquid onto a recording medium prior to the ink liquid, and causing this treatment liquid to react with the ink. When using pigment particles as the coloring material, the treatment liquid has the function of aggregating the pigment particles by neutralizing the Coulomb repulsion of the particles and thereby increasing the viscosity of the ink liquid. Thereby, interference between deposited dots is suppressed and sharply defined images can be recorded without the occurrence of non-uniformities in density.

Moreover, technology is also known in which thermoplastic resin particles (polymer particles) are added to ink in order to impart a suitable luster to the formed image or to achieve good adhesiveness with the recording medium. If thermoplastic resin particles are added, then by selecting a suitable particle size and dispersant, it is possible to raise the speed of aggregation, which is beneficial for recording sharply defined images.

Furthermore, in a high-seed printing method of this kind, it is necessary to dry the printed ink, and if this drying is not sufficient, then problems of movement of the ink or blocking (sticking of the recording medium) may occur when the recording medium is outputted. Moreover, in particular when a water-based ink is used, there is a large problem of curl occurring in the recording medium due to insufficient drying. In response to this, technology is known for resolving these problems by carrying out heating and drying after depositing ink on the recording medium.

Japanese Patent Application Publication No. 2007-160839 discloses heating and drying the recording medium within three seconds after depositing droplets of ink. By this means, it is possible to prevent curl and improve the print density.

Japanese Patent Application Publication No. 2003-048317 discloses depositing a fixing agent that fixes the ink onto the recording medium, heating and drying the undercoating liquid, depositing ink, depositing a fixing agent onto the recording medium, and heating and drying the ink layer.

PCT Publication No. WO 94/01283 discloses an inkjet recording apparatus of an intermediate transfer type, in which ink containing a thermoplastic resin is deposited onto an intermediate transfer medium, the ink is heated to the softening point of the resin or higher, and the ink is transferred onto a recording medium.

However, it has become clear that in a case where an aggregating treatment liquid is deposited onto the recording medium, droplets of an ink containing thermoplastic resin particles are deposited onto the recording medium and the ink film formed on the recording medium is heated and dried, there is problem that the thermoplastic resin particles on the recording medium fuse due to the effects of heating and drying and thus give rise to contraction and deformation of the image.

FIG. 14A shows a satisfactory image that has been formed by drying the ink film at room temperature, and FIG. 14B shows an image in which deformation has occurred due to heating of the ink film. The images in these examples are images of white characters on a black background, in which the contraction of the ink film surrounding the characters produces image deformation which appears as thickening of the characters.

SUMMARY OF THE INVENTION

The present invention has been contrived in view of these circumstances, an object thereof being to provide an image forming method and an image forming apparatus whereby, when forming an image on a medium by using ink containing coloring material and resin particles and a treatment liquid for aggregating the coloring material, contraction and deformation of the image due to drying by heating can be prevented and an image of high quality can be formed.

In order to attain the aforementioned object, the present invention is directed to an image forming method of forming an image on a medium by using ink and treatment liquid, the ink containing coloring material and thermoplastic resin particles in a solvent, the treatment liquid containing a component which aggregates the coloring material, the method comprising: a treatment liquid deposition step of depositing the treatment liquid onto the medium to form a treatment liquid film on the medium; an ink droplet deposition step of ejecting and depositing droplets of the ink onto the medium to form an ink film on the medium on which the treatment liquid film has been formed; and an ink film drying step of heating and drying the ink film under conditions where $T<MFT+20°$ C. until $\alpha$ declines to a state not higher than 2.0 from a state exceeding 2.0, where T is a surface temperature of the ink film, MFT is a minimum film forming temperature of the thermoplastic resin particles, and $\alpha$ is a solvent content rate of the ink film formed on the medium in the ink droplet deposition step defined as a volume of the solvent per unit surface area in the ink film divided by a volume of solid material per unit surface area in the ink film.

In the present specification, the solvent content rate $\alpha$ is defined as the ratio between the volume of the solvent per unit surface area in the ink film and the volume of the solid material per unit surface area in the ink film. Here, the "unit surface area" is the unit surface area of the contact surface between the ink film and the medium or the base material. In other words, the solvent content rate α is the rate of volumes between the solvent and the solid material on the contact surface. This solvent content rate a can also be determined as the ratio between the volume of the solvent per unit surface area of the ink film and the volume of the solid material per unit surface area of the ink film, and the present invention also encompasses cases of this kind. Furthermore, in the solvent content rate α, the solvent includes the solvent of the treatment liquid that is left on the medium until the ink droplet deposition step.

According to this aspect of the present invention, the ink film on the medium is heated and dried under conditions of T<MFT+20° C., until the solvent content rate a of the ink film on the medium falls to a value of 2.0 or lower from a value exceeding 2.0, and therefore contraction and deformation of the image is prevented by suppressing the contraction of the ink film in the direction parallel to the medium surface which accompanies fusion of the thermoplastic resin particles. Therefore, an image of high quality can be formed.

Preferably, the image forming method further comprises a treatment liquid film drying step of heating and drying the treatment liquid film on the medium formed in the treatment liquid deposition step, after carrying out the treatment liquid deposition step and before carrying out the ink droplet deposition step.

According to this aspect of the present invention, it is possible to prevent image deformation caused by floating or movement of the coloring material in the ink film on the medium, and therefore an image of even higher quality can be formed.

Preferably, in the ink film drying step, the heating and drying are carried out by setting the film surface temperature T to be not lower than MFT by a time of completion of the heating and drying of the ink film after the solvent content rate a has become not higher than 2.0.

According to this aspect of the present invention, since the surface of the ink film is made smooth by means of the thermoplastic resin forming a film, then it is possible to form an image of higher quality.

Preferably, in the ink film drying step, the heating and drying are carried out by raising the film surface temperature T after the solvent content rate a has become not higher than 2.0.

According to this aspect of the present invention, it is possible to avoid image deformation at the same time as achieving image luster, as well as being able to shorten the drying duration of the ink film, and therefore an image of high quality can be formed at high speed.

Preferably, the image forming method further comprises a fixing step of pressing and fixing the ink film onto the medium by means of a heated member, after carrying out the ink film drying step.

According to this aspect of the present invention, since the surface of the ink film is made smooth by heating and pressing, then it is possible to form an image of yet higher quality.

In order to attain the aforementioned object, the present invention is also directed to an image forming apparatus which forms an image on a medium by using ink and treatment liquid, the ink containing coloring material and thermoplastic resin particles in a solvent, the treatment liquid containing a component which aggregates the coloring material, the apparatus comprising: a treatment liquid deposition device which deposits the treatment liquid onto the medium to form a treatment liquid film on the medium; an ink droplet ejection device which ejects and deposits droplets of the ink onto the medium to form an ink film on the medium on which the treatment liquid film has been formed; and an ink film drying device which heats and dries the ink film under conditions where T<MFT+20° C. until a declines to a state not higher than 2.0 from a state exceeding 2.0, where T is a surface temperature of the ink film, MFT is a minimum film forming temperature of the thermoplastic resin particles, and a is a solvent content rate of the ink film formed on the medium by the ink droplet deposition device defined as a volume of the solvent per unit surface area in the ink film divided by a volume of solid material per unit surface area in the ink film.

According to the present invention, when forming an image on a medium by using an ink containing a coloring material and resin particles and a treatment liquid that aggregates the coloring material, contraction and deformation of the image due to the heating and drying process is prevented and therefore images of high quality can be formed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a table of results of evaluation experiments;

FIG. 9 is a table of results of evaluation experiments;

FIG. 10 is a table of results of evaluation experiments;

FIG. 12 is a table of results of evaluation experiments;

DETAILED DESCRIPTION OF THE PREFERRED EMBODIMENTS

Figure 1:
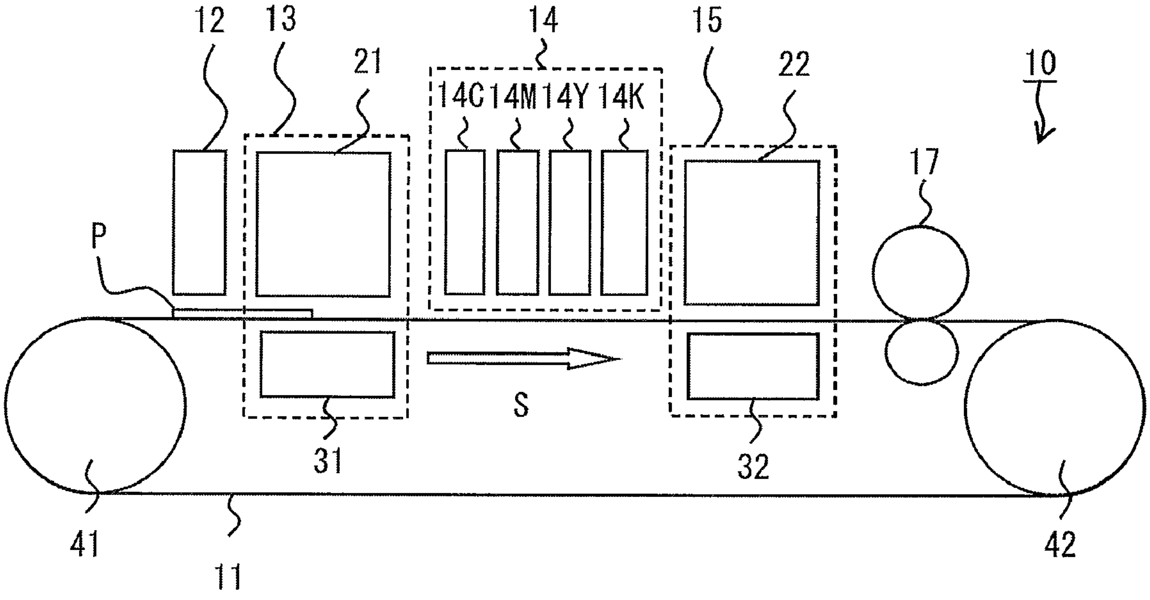
FIG. 1 is a schematic drawing of an image forming apparatus used to describe the principles of an image forming method according to an embodiment of the present invention.

FIG. 1 shows an image forming apparatus using an image forming method according to an embodiment of the present invention.

In FIG. 1, the image forming apparatus 10 includes: a conveyance device, which conveys a recording medium P (hereinafter also referred to as a "base material"); a treatment liquid deposition device 12, which deposits treatment liquid onto the base material P; a treatment liquid drying device 13, which heats and dries the treatment liquid film formed on the base material P by the deposition of the treatment liquid; an ink droplet ejection device 14, which ejects and deposits droplets of ink onto the base material P; an ink drying device 15, which heats and dries the ink film formed on the base material P by the deposition of the ink droplets; and a heat and pressure fixing device 17, which fixes the ink film onto the base material P by applying heat and pressure to the ink film on the base material P.

The ink contains a coloring material and thermoplastic resin particles in a solvent. The treatment liquid contains a component that aggregates the coloring material in the ink. More specific examples of the ink and the treatment liquid which can be used in the present invention are described hereinafter.

The base material P is conveyed from the left-hand side to the right-hand side in the drawing, following the conveyance direction indicated by an arrow S, by the conveyance device 11.

When the base material P has been conveyed to a position opposing the treatment liquid deposition device 12 by the conveyance device 11, the treatment liquid is deposited thereon by the treatment liquid deposition device 12. Firstly, there is a mode in which droplets of the treatment liquid are ejected and deposited onto the base material P using a liquid ejection head having a plurality of nozzles. For example, the treatment liquid is supplied at a supply volume of around 5 $g/m^2$ onto the whole surface of the base material P. In order to shorten the drying duration and reduce the heating energy, it is desirable that droplets of the treatment liquid should be deposited so as to trace the image area on the base material P. Secondly, there is a mode where the treatment liquid is applied onto the base material P by using a roller. When applying the treatment liquid with the roller, it is possible to deposit the treatment liquid in a thinner layer than when ejecting and depositing droplets of the treatment liquid as described above. In this case also, the drying duration can be shortened and the required heating energy can be reduced.

The treatment liquid film formed on the base material P by the deposition of the treatment liquid is heated and dried by the treatment liquid drying device 13. The treatment liquid drying device 13 in the present embodiment is constituted of a hot air drier (blower) 21, which blows heated air (hot air) onto the base material P, and an electric heater 31, which heats the base material P by converting electrical energy into thermal energy. The solvent content rate of the treatment liquid film on the base material P is reduced by the treatment liquid drying device 13, thereby forming a solid or semi-solid treatment liquid film on the base material P. By removing the solvent of the treatment liquid, the adhesiveness between the coloring material and the base material P when the ink is deposited as described below is made stronger, and therefore it is possible to form a particularly good image.

Ink droplets are then ejected and deposited by the ink droplet ejection device 14 onto the base material P on which the film of the treatment liquid has been formed. In the present embodiment, droplets of the ink are ejected respectively from ink droplet ejection heads 14C, 14M, 14Y and 14K, in the order cyan (C) ink, magenta (M) ink, yellow (Y) ink and black (K) ink, in accordance with the desired image signal. For example, the ink ejection volume is 2 μl and the recording density is 1200 dpi in both the main scanning direction (the breadthways direction of the base material P) and the sub-scanning direction (the conveyance direction of the base material P).

The ink film formed on the base material P by the deposition of the ink droplets is heated and dried by the ink drying device 15. The ink drying device 15 in the present embodiment is constituted of a hot air drier (blower) 22 and an electric heater 32. The solvent content rate of the ink film on the base material P is reduced by the ink drying device 15, thereby forming a solid or semi-solid ink film on the base material P.

If there is still solvent remaining in the treatment liquid on the base material P before the deposition of the ink droplets, then the ink drying device 15 of course reduces or removes the solvent of the treatment liquid together with the solvent of the ink.

After heating and drying the ink film, fixing by application of heat and pressure (hereinafter referred to as "heat and pressure fixing") is carried out by the heat and pressure fixing device 17 in order to fix the ink film forming an image on the base material P by applying heat and pressure to the ink film. The heat and pressure fixing device 17 includes a heating roller of which the temperature can be adjusted. By setting the temperature of the heating roller to a higher temperature than the glass transition point of the thermoplastic resin particles, it is possible to smooth the surface of the ink film and thereby to obtain good image luster.

In the above-described embodiment, each of the treatment liquid drying device 13 and the ink drying device 15 is provided with both the hot air drier 21 or 22 and the electric heater 31 or 32; however, it is also possible to provide only one of the hot air drier and the electric heater.

Furthermore, the treatment liquid drying device 13 and the heat and pressure fixing device 17 are optional and can be omitted.

Next, the heating and drying method in the ink drying device 15 is described.

From the viewpoint of shortening the drying duration, it is desirable that the ink film on the base material P should be heated at the highest possible temperature, but from the viewpoint of forming images of high quality, in the present embodiment, the ink film on the base material P is heated by setting the surface temperature T of the ink film within a temperature range corresponding to the minimum film forming temperature (MFT) of the thermoplastic resin particles.

Image deformation caused by heating of the ink film is closely related to the minimum film forming temperature MFT of the thermoplastic resin particles, and through detailed experimentation carried out by the present inventor, the following points were discovered in relation to the conditions under which image deformation occurs.

(1) Image deformation does not occur under conditions where the surface temperature (heating temperature) T of the ink film is not higher than MFT+20° C. (a temperature of 20° C. above MFT), but severe deformation occurs if the ink film is heated to a temperature higher than MFT+20° C.

(2) If the ink film is heated to a temperature higher than MFT+20° C. in a state where the solvent has been removed from the ink film (e.g., a state achieved by drying at room temperature), then contraction of the image does not occur, whereas if the ink film is heated to a temperature higher than MFT+20° C. in a state where the ink film contains a large amount of solvent, then image contraction does occur. If the solvent content rate a of the ink film a defined as "the volume of solvent"/"the volume of solid material" in the ink film exceeds 2.0, image contraction occurs, whereas if a does not exceed 2.0, then marked contraction of the image is not observed.

(3) Image deformation does not occur if the aggregating treatment liquid is not deposited, but does occur if the aggregating treatment liquid is deposited.

Figure 2A:
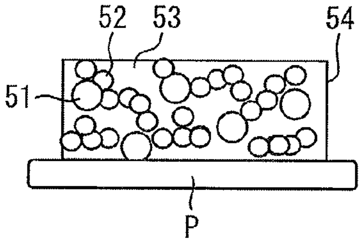
FIGS. 2A to 2C are illustrative diagrams showing the states of an ink film containing a large amount of solvent when the ink film is heated.
Figure 2B:
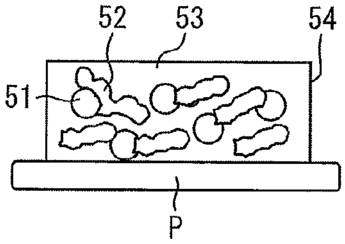
Figure 2C:
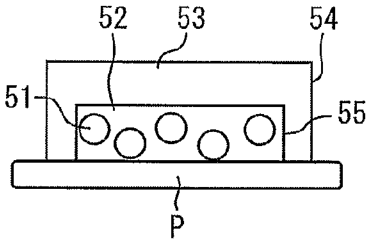

FIGS. 2A to 2C are schematic drawings showing a case where the ink film 54 is heated to have the surface temperature T exceeding MFT+20° C. in a state where the solvent content rate a of the ink film 54 exceeds 2.0 (a state of excessive solvent). As shown in FIG. 2A, an ink film 54 in which coloring material particles (pigment particles) 51 and thermoplastic resin particles 52 are distributed in the solvent 53 is formed on the medium P by the deposition of ink droplets. By heating the ink film 54 so that the surface temperature T of the ink film 54 is higher than MFT+20° C. in the state of excessive solvent, fusion of the resin particles 52 occurs as shown in FIG. 2B. For this reason, a contracting force acts in the horizontal direction on solid material 55 forming the image, as shown in FIG. 2C.

Figure 3A:
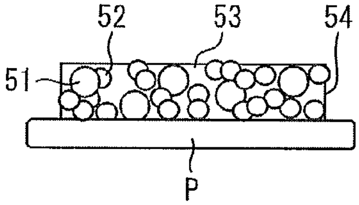
FIGS. 3A to 3C are illustrative diagrams showing the states of an ink film containing a small amount of solvent when the ink film is heated.
Figure 3B:
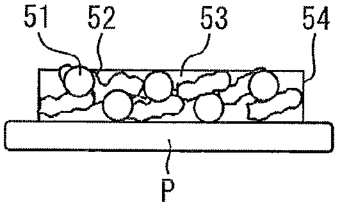
Figure 3C:
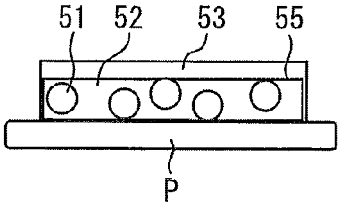

FIGS. 3A to 3C are schematic drawings showing a case where the ink film 54 is heated to have the surface temperature T exceeding MFT+20° C. in a state where the solvent content rate a of the ink film 54 is not higher than 2.0 (a state where solvent has been removed). Even if the ink film 54 is heated so that the surface temperature T of the ink film 54 is higher than MFT+20° C. in the state shown in FIG. 3A, fusion of the resin particles 52 occurs as shown in FIG. 3B. However, in this case, since the amount of solvent 53 is small, then as shown in FIG. 3C, virtually no contraction of solid material 55 forming the image occurs in the horizontal direction.

From these experiments, it is inferred that image deformation due to heating is caused by contraction resulting from the fusion of the resin particles 52. Furthermore, it is inferred that in a state where the solvent 53 has been removed, the resin particles 52 form a layer and the coloring material particles 51 lose their freedom of movement, which means that contraction does not occur in the horizontal direction. Moreover, it is also inferred that since the Coulomb repulsion between the particles is lost due to the presence of the aggregating treatment liquid, then a state arises where contraction is liable to occur. The details of the experimental results are described in detail below.

In the image forming apparatus 10 in FIG. 1, the ink film is heated and dried under conditions where T<MFT+20° C. until the solvent content rate a declines to a state not higher than 2.0 from a state exceeding 2.0, where T is the surface temperature of the ink film on the base material P, MFT is the minimum film forming temperature of the thermoplastic resin particles, and $\alpha$ is the solvent content rate of the ink film on the base material P (namely, the volume of the solvent per unit surface area in the ink film divided by the volume of the solid material per unit surface area in the ink film). Here, T is not lower than room temperature. The "unit surface area" is the unit surface area of the contact interface between the ink film and the base material P.

Moreover, after the solvent content rate a of the ink film has fallen to 2.0 or lower and until the heating and drying of the ink film has been completed, the heating and drying of the ink film is carried out by setting the film surface temperature T of the ink film to a temperature not lower than the MFT of the thermoplastic resin particles. Since the surface of the ink film is made smooth by means of the thermoplastic resin forming a film, then it is possible to form an image of yet higher quality.

Furthermore, desirably, the temperature T of the surface of the ink film should be raised further after the solvent content rate a of the ink film has become 2.0 or lower. This makes it possible to avoid image deformation at the same time as achieving image luster, and also makes it possible to shorten the drying duration of the ink film, and therefore an image of high quality can be formed at high speed.

The image forming apparatus 10 shown in FIG. 1 is provided with the conveyance device 11 including a conveyance belt wound about conveyance rollers 41 and 42; however, the conveyance device is not limited in particular to the conveyance belt. An embodiment where conveyance is performed by a rotating body (pressure drum) which can be temperature adjusted is described below.

Furthermore, the image forming apparatus 10 can eject and deposit droplets of C, M, Y and K inks; however, but it is also possible to use inks other than these, and it is also possible to omit one or more of the inks (e.g., black (K) ink), or to adopt a composition which ejects droplets of a single color of ink (e.g., black (K) ink).

Figure 4:
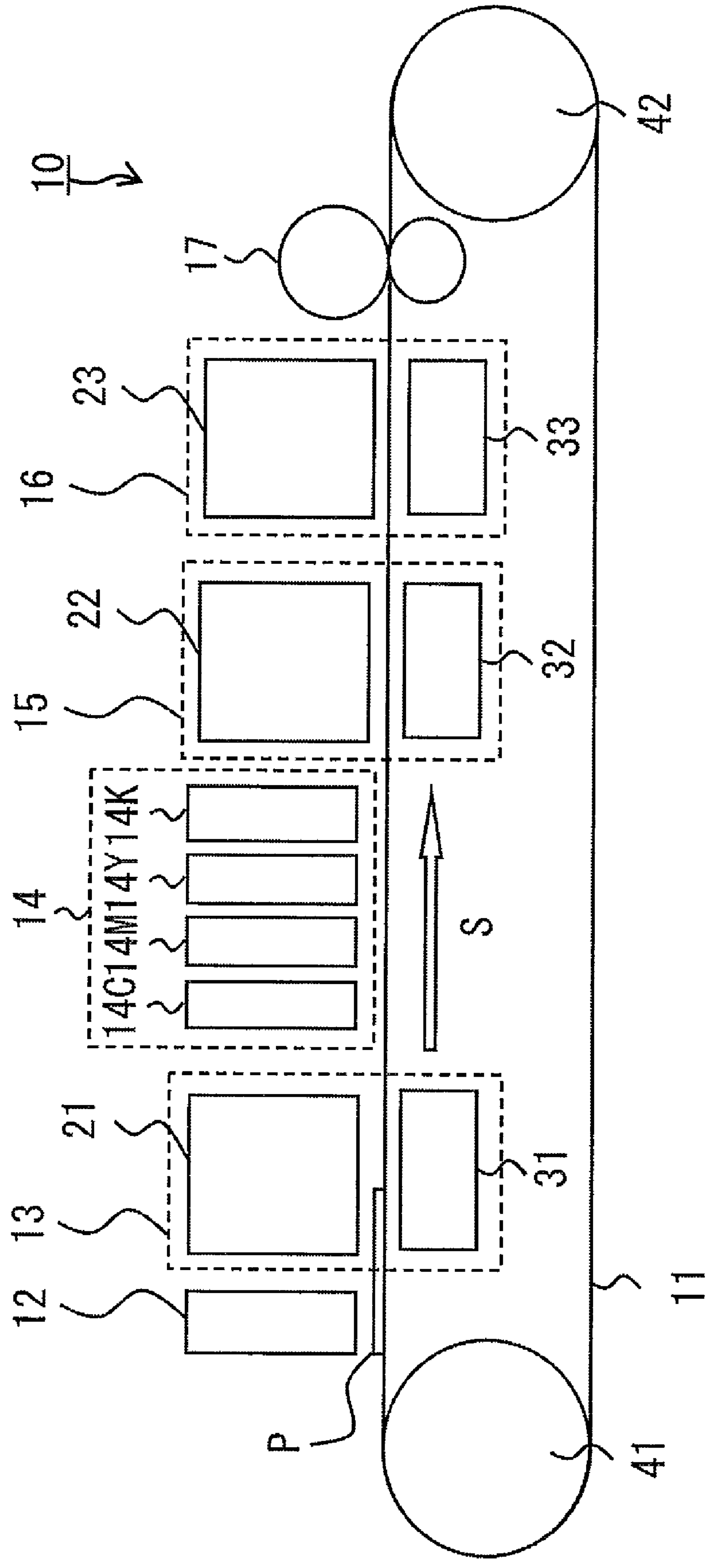
FIG. 4 is a schematic drawing of an image forming apparatus according to another embodiment.

As shown in FIG. 4, it is also possible to provide two-stage ink drying devices 15 and 16. In the present embodiment, the ink drying devices 15 and 16 are respectively constituted of hot air driers 22 and 23 and heaters 32 and 33. For example, in the first-stage ink drying device 15, which follows the ink droplet ejection device 14 in the conveyance direction S, the ink film is heated so that the surface temperature T of the ink film comes in the range of T<MFT+20° C., and in the second-stage ink drying device 16, the ink film is heated and dried by raising the surface temperature T of the ink to a range of T≧MFT+20° C.

Figure 5:
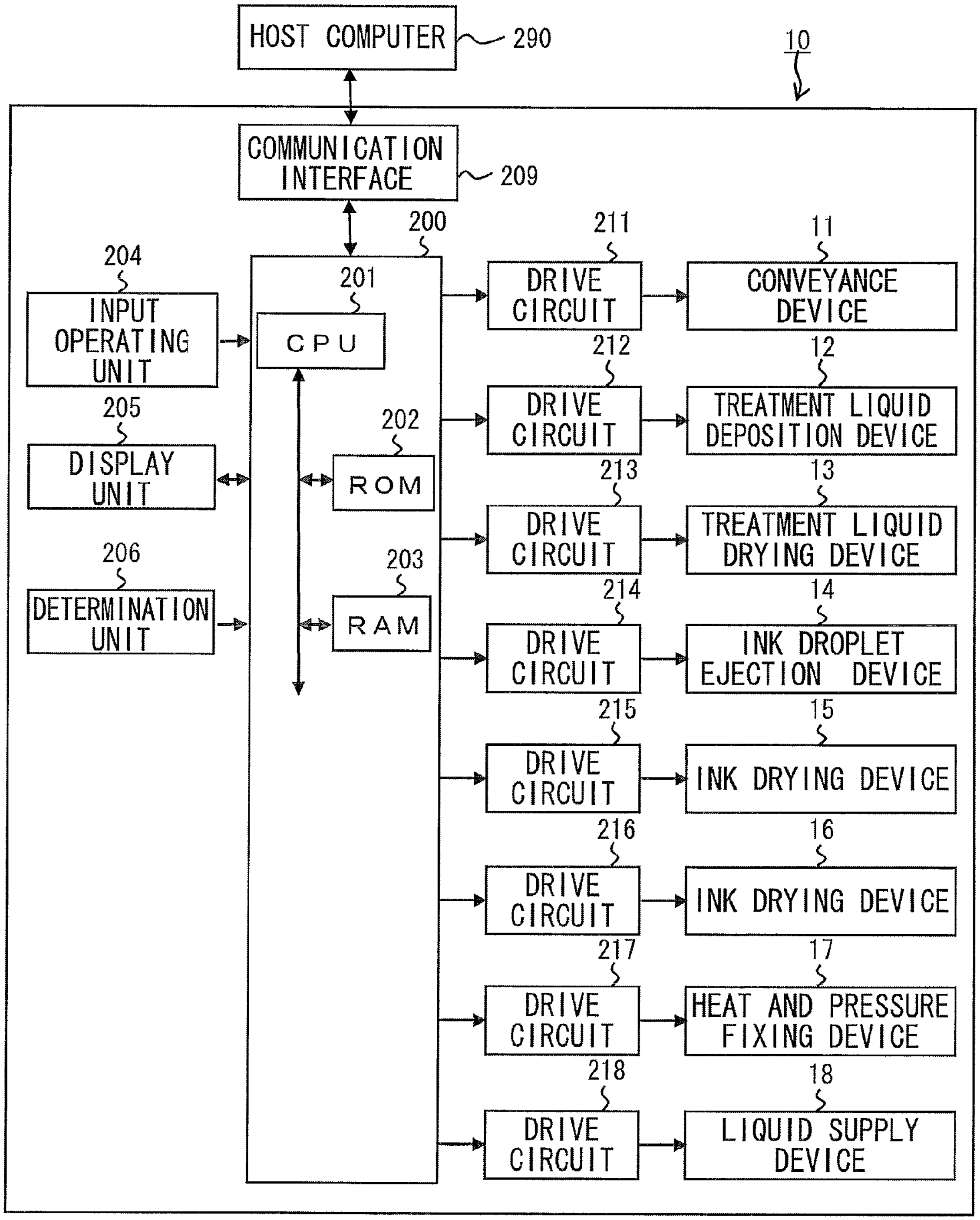
FIG. 5 is a block diagram showing a control system of the image forming apparatus in FIG. 4.

FIG. 5 is a block diagram showing the control system of the image forming apparatus 10 shown in FIG. 4. In FIG. 5, a control unit 200 controls the whole of the image forming apparatus 10. The control unit 200 includes: a CPU (Central Processing Unit) 201, which executes processing of various types in accordance with a prescribed program; a ROM (Read Only Memory) 202, which stores the program, and the like; and a RAM (Random Access Memory) 203, which temporarily stores data, and the like, that is used in the various types of processing carried out by the CPU 201. An input operating unit 204 is constituted of a keyboard which is used to input prescribed instructions or data. A display unit 205 is constituted of a liquid crystal display monitor, which provides various displays, such as the input and settings status of the image forming apparatus 10.

A determination unit 206 including a sensor, or the like, for determining the position of the medium P is connected to the control unit 200. A communication interface 209 which performs communications with a host computer 290 is connected to the control unit 200. The communication interface 209 receives image data indicating an image to be formed on the medium P, from the host computer 290. Moreover, the control unit 200 is connected to the conveyance device 11, the treatment liquid deposition device 12, the treatment liquid drying device 13, the ink droplet ejection device 14, the ink drying devices 15 and 16, the heat and pressure fixing device 17, and the liquid supply device 18, through respective drive circuits 211, 212, 213, 214, 215, 216, 217 and 218. The liquid supply device 18 supplies the treatment liquid from a treatment liquid tank (not shown) to the treatment liquid deposition device 12. Furthermore, the liquid supply device 18 supplies the ink from an ink tank (not shown) to the ink droplet ejection device 14.

In the present embodiment, the blower 21 and the heater 31 of the treatment liquid drying device 13 are controlled by the control unit 200, so as to set the surface temperature of the treatment liquid film on the base material P to a suitable degree. Furthermore, the blowers 22 and 23 and the heaters 32 and 33 of the ink drying devices 15 and 16 are controlled by the control unit 200, so as to set the surface temperature of the ink film on the base material P to a suitable degree.

In setting the surface temperatures of the treatment liquid film and the ink film to suitable degrees, the design values required to achieved these suitable surface temperature degrees (namely, the relative positions of the blowers 21, 22 and 23 and the heaters 31, 32 and 33, their drive sequence, drive values, and the like) are determined and the control unit 200 reads out the previously determined drive sequence and drive values from the ROM 202, or the like, and accordingly controls the heating and drying of the treatment liquid film and the ink film. It is also possible to receive (input) instructions from the host computer 290 through the communication interface 209 and to control heating and drying in accordance with these instructions.

Furthermore, it is also possible to provide a temperature measurement device (thermometer) which determines the surface temperature of the ink film, in the determination unit 206, and to perform feedback control to set the surface temperature of the film to the suitable degree by driving the ink drying devices 15 and 16 on the basis of the measured film surface temperature.

Ink

The ink used in the present embodiment includes as solvent-insoluble materials that do not dissolve in the solvent, a pigment, which is coloring material (colorant) and thermoplastic resin particles, in a dispersed state in the solvent. The thermoplastic resin particles are polymer particles which include a resin (thermoplastic resin) that becomes soft and moldable when heated to its glass transition temperature. Below, the thermoplastic resin particles may be referred to as "polymer particles".

In the present specification, a liquid in which thermoplastic resin particles are dispersed may be referred to as a "resin emulsion". A "resin emulsion" includes a liquid (suspension) in which thermoplastic resin particles are present in the form of solid particles.

The ink used in the present embodiment can be prepared by making a resin emulsion that contains thermoplastic resin particles and then mixing the resin emulsion with a solvent and coloring material. However, it is of course also possible to prepare an ink by mixing a solvent and a coloring material directly with thermoplastic resin particles.

It is desirable that the concentration of the solvent-insoluble materials in the ink is not less than 1 wt % and not more than 20 wt %, taking account of the fact that the viscosity of the ink suitable for ejection is 20 mPa·s or lower. It is more desirable that the concentration of the pigment in the ink is not less than 4 wt %, in order to obtain good optical density in the image. It is desirable that the surface tension of the ink is not less than 20 mN/m and not more than 40 mN/m, taking account of ejection stability.

The coloring material in the ink may be pigment or a combination of pigment and dye. From the viewpoint of the aggregating characteristics when the ink comes into contact with the treatment liquid, a dispersed pigment in the ink is desirable for more effective aggregation. Desirable pigments include: a pigment dispersed by a dispersant, a self-dispersing pigment, a pigment in which the pigment particle is coated with a resin (hereinafter referred to as "microcapsule pigment"), and a polymer grafted pigment. Moreover, from the viewpoint of the aggregating characteristics of the coloring material, it is more desirable that the coloring material is modified with a carboxyl group having a low degree of dissociation.

There are no particular restrictions on the resin used for a microcapsule pigment, but desirably, it should be a compound of high molecular weight which has a self-dispersing capability or solubility in water, and contains an anionic group (acidic). Generally, it is desirable that the resin should have a number average molecular weight in the approximate range of 1,000 to 100,000, and especially desirably, in the approximate range of 3,000 to 50,000. Moreover, desirably, this resin can dissolved in an organic solvent to form a solution. By limiting the number average molecular weight of the resin to this range, it is possible to make the resin display satisfactory functions as a covering film for the pigment particle, or as a coating film in the ink composition.

The resin may itself have a self-dispersing capability or solubility, or these functions may be added or introduced. For example, it is possible to use a resin having an introduced carboxyl group, sulfonic acid group, or phosphonic acid group or another anionic group, by neutralizing with an organic amine or alkali metal. Moreover, it is also possible to use a resin into which one or two or more anionic groups of the same type or different types have been introduced. In the embodiment of the present invention, it is desirable to use a resin which has been neutralized by means of a salt and which contains an introduced carboxyl group.

There are no particular restrictions on the pigment used in the present embodiment, and specific examples of orange and yellow pigments are: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C.I. Pigment Yellow 185.

Specific examples of red and magenta pigments are: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, and C.I. Pigment Red 222.

Specific examples of green and cyan pigments are: C. I. Pigment Blue 15, C. I. Pigment Blue 15:2, C. I. Pigment Blue 15:3, C. I. Pigment Blue 16, C. I. Pigment Blue 60, and C.I. Pigment Green 7.

Specific examples of a black pigment are: C.I. Pigment Black 1, C.I. Pigment Black 6, and C.I. Pigment Black 7.

The ink used in the present embodiment contains polymer particles that do not contain any colorant, as a component for reacting with the treatment liquid. The polymer particles can improve the image quality by strengthening the ink viscosity raising action and the aggregating action through reaction with the treatment liquid. In particular, a highly stable ink can be obtained by adding anionic polymer particles to the ink.

By using the ink containing the polymer particles that produce the viscosity raising action and the aggregating action through reaction with the treatment liquid, it is possible to increase the quality of the image, and at the same time, depending on the type of polymer particles, the polymer particles may form a film on the recording medium, and therefore beneficial effects can be obtained in improving the wear resistance and the waterproofing characteristics of the image.

The method of dispersing the polymer particles in the ink is not limited to adding an emulsion of the polymer particles to the ink, and the resin may also be dissolved, or included in the form of a colloidal dispersion, in the ink.

The polymer particles may be dispersed by using an emulsifier, or the polymer particles may be dispersed without using any emulsifier. For the emulsifier, a surfactant of low molecular weight is generally used, and it is also possible to use a surfactant of high molecular weight. It is also desirable to use a capsule type of polymer particles having an outer shell composed of acrylic acid, methacrylic acid, or the like (core-shell type of polymer particles in which the composition is different between the core portion and the outer shell portion).

The polymer particles dispersed without any surfactant of low molecular weight are known as the soap-free latex, which includes polymer particles with no emulsifier or a surfactant of high molecular weight. For example, the soap-free latex includes polymer particles that use, as an emulsifier, the above-described polymer having a water-soluble group, such as a sulfonic acid group or carboxylic acid group (a polymer with a grafted water-soluble group, or a block polymer obtained from a monomer having a water-soluble group and a monomer having an insoluble part).

It is especially desirable in the present embodiment to use the soap-free latex compared to other type of resin particles obtained by polymerization using an emulsifier, since there is no possibility that the emulsifier inhibits the aggregating reaction and film formation of the polymer particles, or that the free emulsifier moves to the surface after film formation of the polymer particles and thereby degrades the adhesive properties between the recording medium and the ink aggregate in which the coloring material and the polymer particles are combined.

Examples of the resin component added as the resin particles to the ink include: an acrylic resin, a vinyl acetate resin, a styrene-butadiene resin, a vinyl chloride resin, an acryl-styrene resin, a butadiene resin, and a styrene resin.

In order to make the polymer particles have high speed aggregation characteristics, it is desirable that the polymer particles contain a carboxylic acid group having a low degree of disassociation. Since the carboxylic acid group is readily affected by change of pH, then the polymer particles containing the carboxylic acid group easily change the state of the dispersion and have high aggregation characteristics.

The change in the dispersion state of the polymer particles caused by change in the pH can be adjusted by means of the component ratio of the polymer particle having a carboxylic acid group, such as ester acrylate, or the like, and it can also be adjusted by means of an anionic surfactant which is used as a dispersant.

Desirably, the resin constituting the polymer particles is a polymer that has both of a hydrophilic part and a hydrophobic part. By incorporating a hydrophobic part, the hydrophobic part is oriented toward to the inner side of the polymer particle, and the hydrophilic part is oriented efficiently toward the outer side, thereby having the effect of further increasing the change in the dispersion state caused by change in the pH of the liquid. Therefore, aggregation can be performed more efficiently.

Examples of commercially available resin emulsion include: Joncryl 537 and 7640 (styrene-acrylic resin emulsion, manufactured by Johnson Polymer), Microgel E-1002 and E-5002 (styrene-acrylic resin emulsion, manufactured by Nippon Paint), Voncoat 4001 (acrylic resin emulsion, manufactured by Dainippon Ink and Chemicals), Voncoat 5454 (styrene-acrylic resin emulsion, manufactured by Dainippon Ink and Chemicals), SAE-1014 (styrene-acrylic resin emulsion, manufactured by Zeon Japan), Jurymer ET-410 (acrylic resin emulsion, manufactured by Nihon Junyaku), Aron HD-5 and A-104 (acrylic resin emulsion, manufactured by Toa Gosei), Saibinol SK-200 (acrylic resin emulsion, manufactured by Saiden Chemical Industry), and Zaikthene L (acrylic resin emulsion, manufactured by Sumitomo Seika Chemicals). However, the resin emulsion is not limited to these examples.

The weight ratio of the polymer particles to the pigment is desirably 2:1 through 1:10, and more desirably 1:1 through 1:3. If the weight ratio of the polymer particles to the pigment is less than 2:1, then there is no substantial improvement in the aggregating force of the aggregate formed by the cohesion of the polymer particles. On the other hand, if the weight ratio of the polymer particles to the pigment is greater than 1:10, the viscosity of the ink becomes too high and the ejection characteristics, and the like, deteriorate.

From the viewpoint of the adhesive force after the cohesion, it is desirable that the molecular weight of the polymer particles added to the ink is no less than 5,000. If it is less than 5,000, then beneficial effects are insufficient in terms of improving the internal aggregating force of the ink aggregate, achieving good fixing characteristics after transfer to the recording medium, and improving the image quality.

Desirably, the volume-average particle size of the polymer particles is in the range of 10 nm to 1 μm, more desirably, the range of 10 nm to 500 nm, even desirably 20 nm to 200 nm and particularly desirably, the range of 50 nm to 200 nm. If the particle size is equal to or less than 10 nm, then significant effects in improving the image quality or enhancing transfer characteristics cannot be expected, even if aggregation occurs. If the particle size is equal to or greater than 1 μm, then there is a possibility that the ejection characteristics from the ink head or the storage stability will deteriorate. Furthermore, there are no particular restrictions on the volume-average particle size distribution of the polymer particles and they may have a broad volume-average particle size distribution or they may have a monodisperse volume-average particle size distribution.

Moreover, two or more types of polymer particles may be used in combination in the ink.

Examples of the pH adjuster added to the ink in the present embodiment include an organic base and an inorganic alkali base, as a neutralizing agent. In order to improve storage stability of the ink for inkjet recording, the pH adjuster is desirably added in such a manner that the ink for inkjet recording has the pH of 6 through 10.

It is desirable in the present embodiment that the ink contains a water-soluble organic solvent, from the viewpoint of preventing nozzle blockages in the ejection head due to drying. Examples of the water-soluble organic solvent include a wetting agent and a penetrating agent.

Examples of the water-soluble organic solvent in the ink are: polyhydric alcohols, polyhydric alcohol derivatives, nitrous solvents, monohydric alcohols, and sulfurous solvents. Specific examples of the polyhydric alcohols are: ethylene glycol, diethylene glycol, propylene glycol, butylene glycol, triethylene glycol, 1,5-pentane diol, 1,2,6-hexane triol, and glycerin. Specific examples of the derivatives of polyhydric alcohol are: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin. Specific examples of the nitrous solvents are: pyrrolidone, N-methyl-2-pyrrolidone, cyclohexyl pyrrolidone, and triethanol amine. Specific examples of the monohydric alcohols are: ethanol, isopropyl alcohol, butyl alcohol, benzyl alcohol, and the like. Specific examples of the sulfurous solvents are: thio diethanol, thio diglycerol, sulfolane, and dimethyl sulfoxide. Apart from these, it is also possible to use propylene carbonate, ethylene carbonate, or the like.

The ink used in the present embodiment may contain a surfactant.

Examples of the surfactant in the ink include: in a hydrocarbon system, an anionic surfactant, such as a salt of a fatty acid, an alkyl sulfate ester salt, an alkyl benzene sulfonate salt, an alkyl naphthalene sulfonate salt, a dialkyl sulfosuccinate salt, an alkyl phosphate ester salt, a naphthalene sulfonate/formalin condensate, and a polyoxyethylene alkyl sulfonate ester salt; and a non-ionic surfactant, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerin fatty acid ester, and an oxyethylene oxypropylene block copolymer. Desirable examples of the surfactant further include: Surfynols (manufactured by Air Products & Chemicals), which is an acetylene-based polyoxyethylene oxide surfactant, and an amine oxide type of amphoteric surfactant, such as N,N-dimethyl-N-alkyl amine oxide.

Moreover, it is also possible to use the surfactants cited in Japanese Patent Application Publication No. 59-157636, pages 37 to 38, and Research Disclosure No. 308119 (1989). Furthermore, it is also possible to use a fluoride type (alkyl fluoride type), or silicone type of surfactant such as those described in Japanese Patent Application Publication Nos. 2003-322926, 2004-325707 and 2004-309806. It is also possible to use a surface tension adjuster of this kind as an anti-foaming agent; and a fluoride or silicone compound, or a chelating agent, such as ethylenediamine tetraacetic acid (EDTA), can also be used.

The surfactant contained in the ink has beneficial effects in raising the wetting properties on the solid or semi-solid aggregating treatment agent layer by reducing the surface tension, and therefore the aggregating action effectively progresses due to the increase in the contact surface area between the solid or semi-solid aggregating treatment agent layer and the ink.

It is desirable in the present embodiment that the ink has the surface tension of 10 mN/m through 50 mN/m; and from the viewpoint of achieving good permeability into the permeable recording medium, formation of fine droplets and good ejection properties, the surface tension of the ink is more desirably 15 mN/m through 45 mN/m.

It is desirable in the present embodiment that the ink has the viscosity of 1.0 mPa·s through 20.0 mPa·s.

Apart from the foregoing, according to requirements, it is also possible that the ink contains a pH buffering agent, an anti-oxidation agent, an antibacterial agent, a viscosity adjusting agent, a conductive agent, an ultraviolet absorbing agent, or the like.

Treatment Liquid

The treatment liquid (aggregating treatment liquid) used in the present embodiment has effects of generating aggregation of the pigment and the polymer particles contained in the ink. For example, the aggregating treatment liquid has such effects by producing a pH change in the ink when coming into contact with the ink.

Specific examples of the contents of the treatment liquid are: polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, cumaric acid, thiophene carboxylic acid, nicotinic acid, derivatives of these compounds, and salts of these.

A treatment liquid having added thereto a polyvalent metal salt or a polyallylamine is the preferred examples of the treatment liquid. The aforementioned compounds may be used individually or in combinations of two or more thereof.

From the standpoint of aggregation ability with the ink, the treatment liquid preferably has a pH of 1 to 6, more preferably a pH of 2 to 5, and even more preferably a pH of 3 to 5.

The amount of the component that causes aggregation of the pigment and polymer particles of the ink in the treatment liquid is preferably not less than 0.01 wt % and not more than 20 wt % based on the total weight of the liquid. Where the amount of this component is less than 0.01 wt %, sufficient concentration diffusion does not proceed when the treatment liquid and ink come into contact with each other, and sufficient aggregation action caused by pH variation sometimes does not occur. Further, where the amount of this component is more than 20 wt %, the ejection ability from the inkjet head can be degraded.

From the standpoint of preventing the nozzles of inkjet heads from being clogged by the dried treatment liquid, it is preferred that the treatment liquid include an organic solvent capable of dissolving water and other additives. A wetting agent and a penetrating agent are included in the organic solvent capable of dissolving water and other additives.

The solvents can be used individually or in a mixture of plurality thereof together with water and other additives.

The content ratio of the organic solvent capable of dissolving water and other additives is preferably not more than 60 wt % based on the total weight of the treatment liquid. Where this amount is higher than 60 wt %, the viscosity of the treatment liquid increases and ejection ability from the inkjet head can be degraded.

In order to improve fixing ability and abrasive resistance, the treatment liquid may further include a resin component. Any resin component may be employed, provided that the ejection ability from a head is not degraded when the treatment liquid is ejected by an inkjet system and also provided that the treatment liquid will have high stability in storage. Thus, water-soluble resins and resin emulsions can be freely used.

An acrylic resin, a urethane resin, a polyester, a vinyl resin, and a styrene resin can be considered as the resin components. In order to demonstrate a sufficient function of improving the fixing ability, a polymer with a comparatively high molecular weight has to be added at a high concentration of 1 wt % to 20 wt %. However, where such a material is added to and dissolved in a liquid, the viscosity thereof increases and ejection ability is degraded. A latex can be effectively added as an adequate material that can be added to a high concentration, while inhibiting the increase in viscosity. Examples of latex materials include alkyl acrylate copolymers, carboxy-modified SBR (styrene-butadiene latex), SIR (styrene-isoprene) latex, MBR (methyl methacrylate-butadiene latex), and NBR (acrylonitrile-butadiene latex). From the standpoint of the process, in order to improve both the stability during storage at normal temperature and the transferability after heating, while ensuring a strong effect during fixing, it is preferred that the glass transition temperature Tg of the latex be not lower than 50° C. and not higher than 120° C. Furthermore, from the standpoint of the process, in order to obtain sufficient fixing at a low temperature, while ensuring a strong effect during fixing, it is preferred that the minimum film-formation temperature MFT be not higher than 100° C., more preferably not higher than 50° C.

The aggregation ability may be further improved by introducing polymer microparticles of reverse polarity with respect to that of the ink into the treatment liquid and causing the aggregation of the pigment contained in the ink with the polymer microparticles.

The aggregation ability may be also improved by introducing a curing agent corresponding to the polymer microparticle component contained in the ink into the treatment liquid, bringing the two liquids into contact, causing aggregation and also crosslinking or polymerization of the resin emulsion in the ink component.

The treatment liquid used in the present embodiment can include a surfactant.

Examples of suitable surfactants of a hydrocarbon system include anionic surfactants such as fatty acid salts, alkylsulfuric acid esters and salts, alkylbenzenesulfonic acid salts, alkylnaphthalenesulfonic acid salts, dialkylsulfosuccinic acid salts, alkylphosphoric acid esters and salts, naphthalenesulfonic acid formalin condensate, and polyoxyethylene alkylsulfuric acid esters and salts, and nonionic surfactants such as polyoxyethyelene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymer. It is preferred that SURFYNOLS (made by Air Products & Chemicals), which is an acetylene-type polyoxyethylene oxide surfactant, be used. Amineoxide-type amphoteric surfactant such as N,N-dimethyl-N-alkylamineoxide is also a preferred surfactant.

A surfactant described in Japanese Patent Application Publication No. 59-157636, pages 37 to 38 and Research Disclosure No. 308119 (1989) can be also used. Fluorine-containing (fluorinated alkyl system) and silicone-type surfactants such as described in Japanese Patent Application Publication Nos. 2003-322926, 2004-325707, and 2004-309806 can be also used. These surface tension adjusting agents can be also used as an antifoaming agent. Chelating agents represented by fluorine-containing or silicone-type compounds and EDTA can be also used.

These agents are effective in reducing surface tension and increasing wettability on the image formation body (recording medium, intermediate transfer body, etc.). Further, even when the ink is the first to be deposited, effective aggregation action proceeds because of increased wettability of the ink and enlarged contact surface area of the two liquids.

The surface tension of the treatment liquid in accordance with the present invention is preferably 10 mN/m to 50 mN/m. From the standpoint of improving the wettability on the intermediate transfer body and also size reduction ability and ejection ability of droplets, it is even more preferred that the surface tension be 15 mN/m to 45 mN/m.

The viscosity of the treatment liquid in accordance with the present invention is preferably 1.0 mPa·s to 20.0 mPa·s.

If necessary, a pH buffer agent, an antioxidant, an antimold agent, a viscosity adjusting agent, an electrically conductive agent, an ultraviolet agent, and (ultraviolet) absorbent, etc. can be also added.

Recording Medium (Base Material)

There are no particular restrictions on the recording medium used in the present embodiment; however, particularly desirable results can be obtained with coated printing papers, which have a slow rate of permeation of the ink solvent.

Possible examples of support media which can be used appropriately for coated paper are: a base paper manufactured using a Fourdrinier paper machine, cylindrical-wire paper machine, twin-wire paper machine, or the like, from main components of wood pulp or pigment, the pulp being either a chemical pulp such as LBKP or NBKP, a mechanical pulp, such as GP, PGW, RMP, TMP, CTMP, CMP, CGP, or the like, or recovered paper pulp, such as DIP, and the main components being mixed with one or more additive of a sizing agent, fixing agent, yield enhancer, cationization agent, paper strength enhancer, or the like, or a base paper provided with a size press layer or anchor coating layer formed using starch, polyvinyl alcohol, or the like, or an art paper, coated paper, or cast coated paper, or the like, formed by providing a coating layer on top of the size press layer or anchor coating layer.

In the method according to the present embodiment, it is possible to use these base papers or coated papers directly without alteration, and it is also possible to use these papers after carrying out a calendering process using a machine calender, TG calender, soft calender, or the like, and thereby controlling the surface smoothness of the paper.

There are no particular restrictions on the weight of the support medium, although generally the weight is approximately 40 g/m$^2$ to 300 g/m$^2$. The coated paper used in the present embodiment has the coating layer formed on the support medium described above. The coating layer includes a coating composition having a main component of pigment and binder, and at least one layer thereof is formed on the support medium.

For the pigment, it is desirable to use a white pigment. Possible examples of the white pigment are: an inorganic pigment, such as precipitated calcium carbonate, heavy calcium carbonate, magnesium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic non-crystalline silica, colloidal silica, alumina, colloidal alumina, pseudo-boehmite, aluminum hydroxide, lithopone, zeolite, hydrated halloysite, magnesium hydroxide, or the like; or an organic pigment, such as a styrene-based plastic pigment, an acrylic plastic pigment, polyethylene, microcapsules, urea resin, melamine resin, or the like.

Possible examples of the binder are: a starch derivative, such as oxidized starch, etherified starch, or phosophoric acid esterized starch; a cellulose derivative, such as carboxymethyl cellulose, hydroxyethyl cellulose, or the like; casein, gelatine, soybean protein, polyvinyl alcohol, or derivatives of same; polyvinyl alcohols having various degrees of saponification or silanol-denatured versions of same, or carboxylates, cationized products, of other derivatives of same; polyvinyl pyrrolidone, maleic anhydride resin, a styrene-butadiene copolymer, a methyl methacrylate-butadiene copolymer, or other conjugated diene copolymer latex; an acrylic polymer latex, such as a polymer or copolymer of acrylate ester and methacrylate ester; a vinyl polymer latex, such as such as an ethylene acetate vinyl copolymer; or a functional group-denatured polymer latex based on these various polymers and a monomer containing a functional group such as a carboxy group; an aqueous adhesive of a heat-curable synthetic resin, such as melamine resin, urea resin, or the like; an acrylate ester such as polymethylmethacrylate; methacrylate ester polymer or copolymer resin, such as methacrylate ester; or a synthetic resin-based adhesive, such as polyurethane resin, unsaturated polyester resin, vinyl chloride-vinyl acetate copolymer, polyvinyl butylal, alkyd resin, or the like.

The combination ratio of the pigment and binder in the coating layer is 3 to 70 parts by weight, and desirably 5 to 50 parts by weight, of binder with respect to 100 parts by weight of pigment. If the combination ratio of the binder with respect to 100 parts by weight of pigment is less than 3 parts by weight, then the coating of the ink receiving layer by the coating composition will have insufficient strength. On the other hand, if the combination ratio is greater than 70 parts by weight, then the absorption of high-boiling-point solvent is slowed dramatically.

Moreover, it is also possible to combine various additives in appropriate fashion in the coating layer, such as: a dye fixing agent, a pigment dispersant, a viscosity raising agent, a fluidity enhancer, an antifoaming agent, a foam suppressant, a separating agent, a foaming agent, a permeating agent, a coloring dye, a coloring pigment, a fluorescent brightener, an ultraviolet light absorber, an antioxidant, an anticorrosive, an antibacterial agent, a waterproofing agent, a wet paper strength enhancer, a dry paper strength enhancer, or the like.

The application amount of the ink receiving layer varies depending on the required luster, the ink absorbing properties and the type of support medium, or the like, and although no general figure can be stated, it is normally 1 g/$m^2$ or greater. Furthermore, the ink receiving layer can also be applied by dividing a certain uniform application amount into two application steps. If application is divided into two steps in this way, then the luster is raised in comparison with a case where the same application amount is applied in one step.

The application of the coating layer can be carried out using one of various types of apparatus, such as a blade coater, roll coater, air knife coater, bar coater, rod blade coater, curtain coater, short dowel coater, size press, or the like, in on-machine or off-machine mode. Furthermore, after application of the coating layer, it is also possible to carry out a smoothing and finishing process on the ink receiving layer by using a calender apparatus, such as a machine calender, a TG calender, a soft calender, or the like.

The number of coating layers can be determined appropriately in accordance with requirements.

The coating paper may be an art paper, high-quality coated paper, medium-quality coated paper, high-quality lightweight coated paper, medium-quality lightweight coated paper, or light-coated printing paper; the application amount of the coating layer is around 40 g/$m^2$ on both surfaces in the case of art paper, around 20 g/$m^2$ on both surfaces in the case of high-quality coated paper or medium-quality coated paper, around 15 g/$m^2$ on both surfaces in the case of high-quality lightweight coated paper or medium-quality lightweight coated paper, and 12 g/$m^2$ or less on both surfaces in the case of a light-coated printing paper. An example of an art paper is Tokubishi Art, or the like; an example of a high-quality coated paper is "Urite"; examples of art papers are Tokubishi Art (made by Mitsubishi Paper Mills), Golden Cask Satin (made by Oji Paper), or the like; examples of coated papers are OK Top Coat (made by Oji Paper), Aurora Coat (made by Nippon Paper Group), Recycle Coat T-6 (made by Nippon Paper Group); examples of lightweight coated papers are Urite (made by Nippon Paper Group), New V Matt (made by Mitsubishi Paper Mills), New Age (made by Oji Paper), Recycle Mat T-6 (made by Nippon Paper Group), and "Pism" (made by Nippon Paper Group). Examples of light-coated printing papers are Aurora L (made by Nippon Paper Group) and Kinmari Hi-L (made by Hokuetsu Paper Mills), or the like. Moreover, examples of cast coated papers are: SA Gold Cask plus (made by Oji Paper), Hi-McKinley Art (Gojo Paper Manufacturing), or the like.

Evaluation Experiments

Next, the evaluation experiments relating to the present invention will be described.

The treatment liquid and the ink used in the evaluation experiments had the respective compositions described below.

| <Treatment liquid> | |
|---|---|
| Malonic acid | 10 parts by weight |
| Sodium hydroxide | 1.8 parts by weight |
| Diethylene glycol monoethyl ether | 20 parts by weight |
| Surfactant 1 | 1 part by weight |
| Deionized water | remainder |

The surfactant 1 described above is represented as:

$CF_3CF_2—(CF_2CF_2)_m—CH_2CH_2—(OCH_2CH_2)_n—OH$.

| <Ink> | |
|---|---|
| Pigment 1 | 4 parts by weight |
| Dispersant polymer 1 | 2 parts by weight |
| Thermoplastic resin particles | 8 parts by weight |
| Glycerin | 15 parts by weight |
| Surfactant 2 | 1 part by weight |
| Deionized water | remainder |

The details of the respective components described above were as follows.

Pigment 1: Comophtal Jet Magenta DMQ (PR-122) (Ciba Specialty Chemicals Inc.)

Dispersant polymer 1: benzyl methacrylate/methyl methacrylate/methacrylic acid, 60/30/10 (weight ratio)

Thermoplastic resin particles: the resin particles 1 or resin particles 2 described below were used as the thermoplastic resin particles.

Resin particles 1: methyl methacrylate/phenoxyethyl acrylate/acrylic acid,
60/35/5 (weight ratio)
MFT=35° C.

Resin particles 2: methyl methacrylate/phenoxyethyl acrylate/acrylic acid,
6/29/5 (weight ratio)
MFT=50° C.

Surfactant 2: Olefin E1010 (made by Nisshin Chemical Industry)

The MFT of the thermoplastic resin particles is not limited to the examples given above, and it is also possible to select various MFT values excluding extreme value ranges, such as MFT<0° C. (where ink stability and ejection stability cannot be guaranteed at room temperature), or MFT>200° C. (where a very large amount of energy is required to form a film and equipment costs becomes very high).

Furthermore, the experimental conditions of the evaluation experiments were stated below.

Base material (recording medium): Tokubishi Art made by Mitsubishi Paper Mills

Deposition of treatment liquid: droplets of the treatment liquid were ejected and deposited by an inkjet head (liquid ejection head). The treatment liquid deposition volume per unit surface area was 5 g/$m^2$.

Drying of treatment liquid: the deposited treatment liquid was dried by heating for two seconds with a rear surface heater at 40° C. and blower at 70° C.

Deposition of ink: droplets of the ink were ejected and deposited by an inkjet head (liquid ejection head). The ink deposition volume per unit surface area was 10.0 g/$m^2$ (in which cyan ink was 5.0 g/$m^2$ and magenta ink was 5.0 g/$m^2$).

Ink drying: the deposited ink was heated and dried by a rear surface heater and a blower (see evaluation experiment results for temperature and drying duration)

Heat and pressure fixing: a metal roller having a diameter of 40 mm which was covered with silicone rubber having a thickness of 1 mm was used as the front surface roller, and a metal roller was used as the rear surface roller. Heating and pressing were carried out with the front surface roller at 80° C., the rear surface roller at 60° C., nip pressure of 1.2 MPa, and nip duration of 20 ms.

Measurement of film surface temperature T: measured by radiation thermometer.

Measurement of solvent content a: ink film thickness d (μm) was measured during drying by a laser displacement meter. The solvent content rate a was calculated as:

$$\alpha=(d-dh)/dh,$$

where d was the thickness of the ink film after droplet ejection, and dh was the thickness of the portion of the film occupied by the solid component, which was calculated as:

$$dh=v\times\beta/\gamma,$$

where v was the ink droplet ejection volume (g/$m^2$), β was the weight ratio of the solid material in the ink, and γ was the specific gravity of the solid material in the ink.

In the present experiments, v, β and γ were as follows.

Ink deposition volume: 10.0 g/$m^2$ (determined by gravimetry)

Pigment: 4 wt % (specific gravity: 1.5)

Thermoplastic resin particles: 8 wt % (specific gravity: 1.1)

Dispersant polymer: 2 wt % (specific gravity: 1.1)

Weight ratio of solid material: 0.16 wt %

Specific gravity of solid material: 1.21 Consequently, dh was calculated as 1.32 μm.

The assessment criteria used in the present evaluation experiments were as stated below.

<Evaluation of Image Deformation>

To acquire an index of image deformation, a square image composed of 100 dots by 100 dots was printed, the surface area of the image was measured, and the contraction rate with respect to the intended image size was measured.

Excellent: image contraction 1% or less (very desirable)

Good: image contraction 3% or less (desirable)

Fair: image contraction 5% or less (acceptable)

Poor: image contraction 5% or more (unacceptable)

<Evaluation of Drying Duration>

The drying duration was defined as the minimum drying duration whereby blocking did not occur in stacked sheets after printing. Blocking was evaluated as described below.

A solid image was printed with the ink at 10.0 g/$m^2$, plain paper was placed on the image directly after printing, the paper was placed between two sheets of acrylic and pressed with a weight of 10 kg. After leaving for one hour, the acrylic sheets were removed, the superimposed sample paper was peeled away by hand, and the extent of adherence was confirmed (A4 paper, environment 23° C. at 50 RH). If the paper could be peeled away without the transfer of the ink or adherence of the paper, then it was considered that no blocking had occurred. If ink transfer occurs or the paper could not be peeled away, then it was considered that blocking had occurred.

<Evaluation of Image Luster>

The luster at 60 degrees was measured using a luster meter (Horiba IG-320).

Poor: luster of 20 or lower (image luster unacceptably low)

Fair: luster of 40 or lower (slightly low image luster, but acceptable)

Good: luster of not lower than 40 and lower than 60 (high image luster, desirable image quality)

Excellent: luster of 60 to 80 (very high image luster, very desirable image quality)

Results of Evaluation Experiments The results of the present evaluation experiments were as stated below.

FIG. 6 shows a table of the results of evaluation experiments carried out when the treatment liquid film was dried after depositing the treatment liquid.

In FIG. 6, "MFT" means the minimum film forming temperature of the thermoplastic resin particles in the ink. The "Drying of treatment liquid" column indicates the heating temperature (heater temperature) and heating duration (unit: seconds) before depositing droplets of the ink. The "Ink drying" column indicates the heating temperature after depositing the ink droplets (heater temperature/air flow temperature). In the present experiments, heating by means of the heater and heating by means of the hot air flow were carried out, and their respective temperatures (heater temperature and air flow temperature) are indicated. The "T(α=2.0)" column indicates the measurement value of the surface temperature T of the ink film when the solvent content rate a of the ink film on the base material P was 2.0. The "T(dry)" column indicates the measurement value of the surface temperature T of the ink film when drying had been completed. The "image deformation", "drying duration" and "image luster" columns indicate evaluations on the basis of the assessment criteria stated above.

Figure 7:
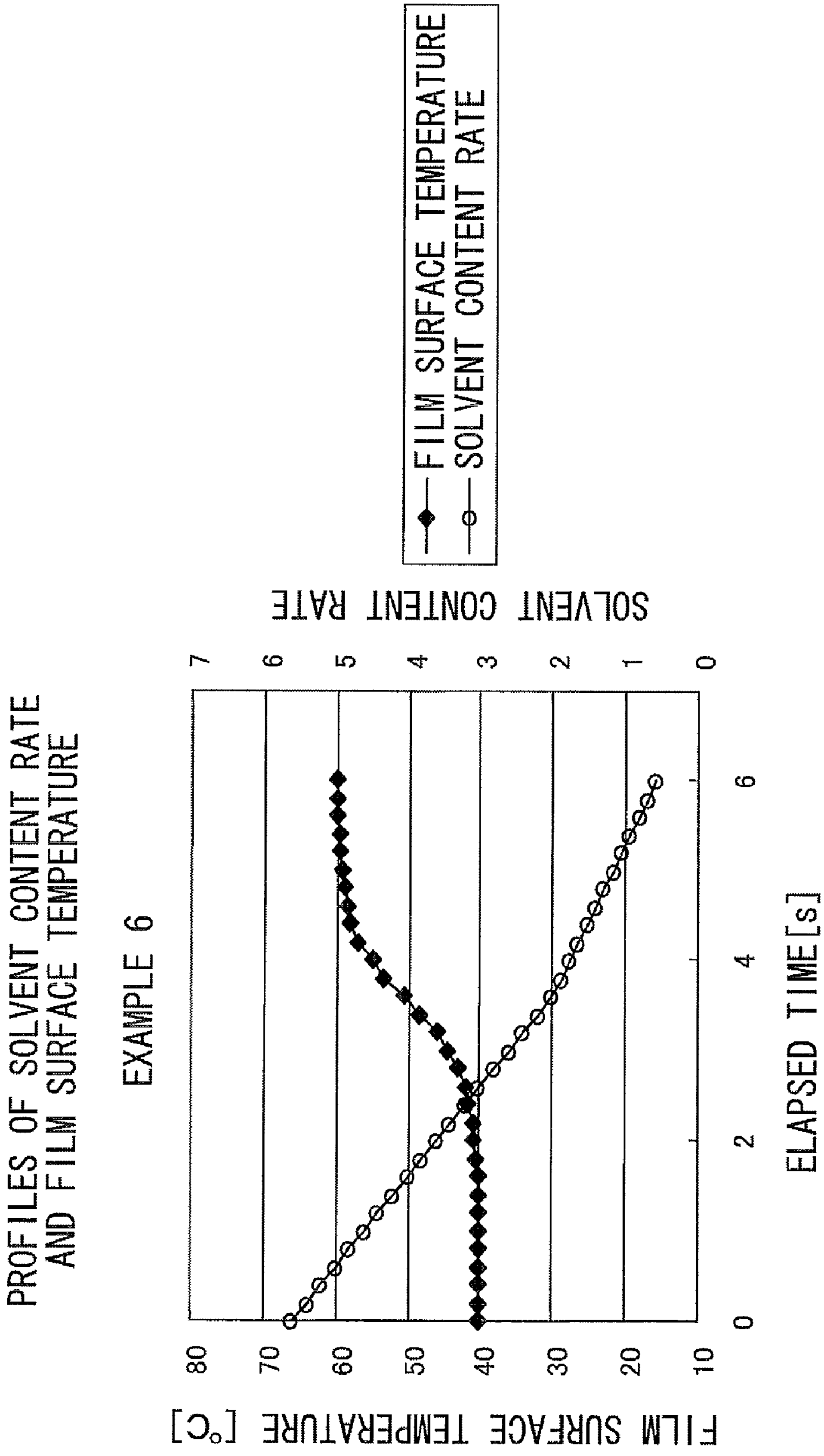
FIG. 7 is a graph showing profiles of a solvent content rate and film surface temperature in Example 6.
Figure 8:
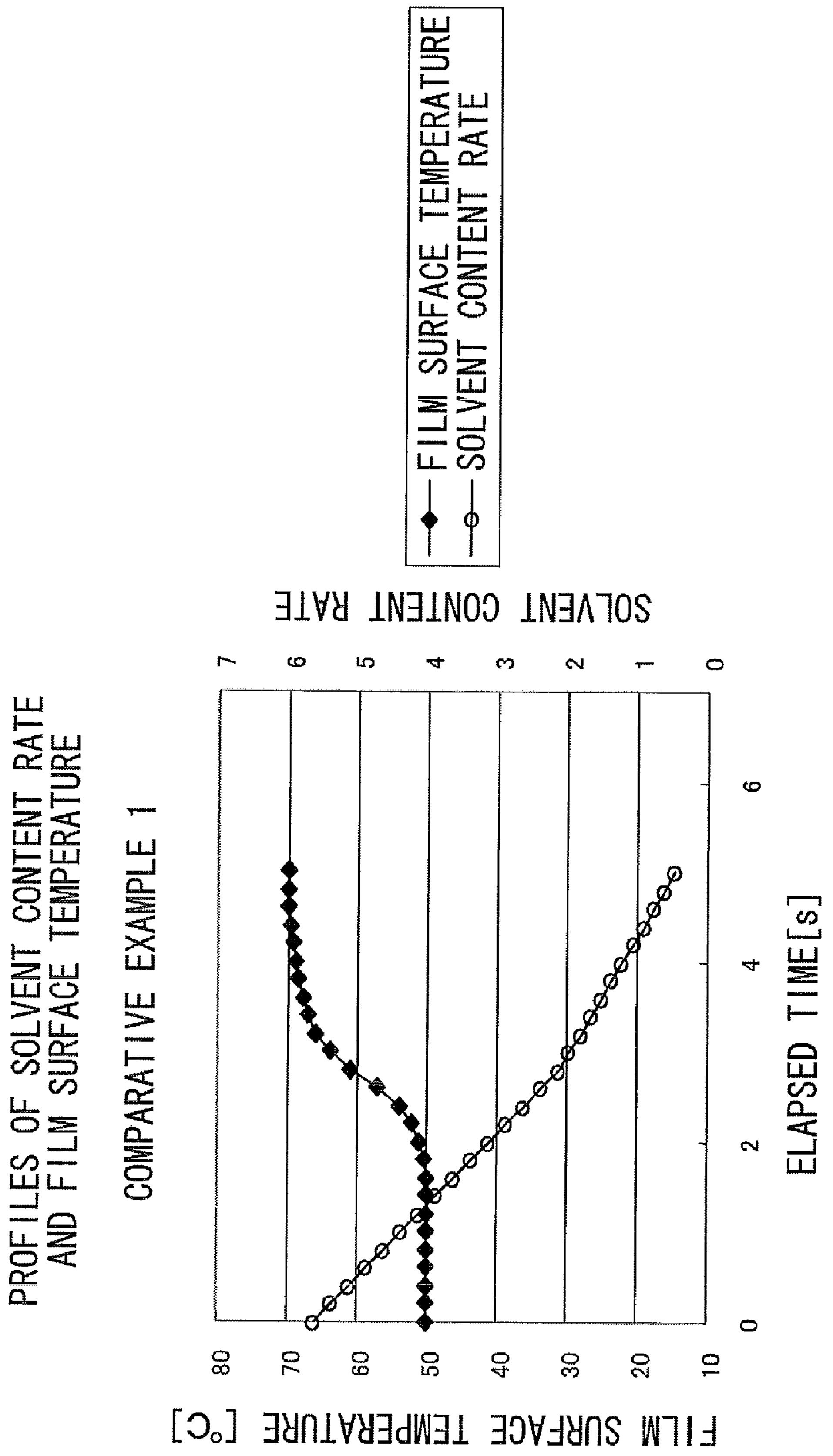
FIG. 8 is a graph showing profiles of a solvent content rate and film surface temperature in Comparative Example 1.

FIGS. 7 and 8 respectively show graphs of the film surface temperature and the solvent content rate in Example 6 and Comparative Example 1 as the typical profiles. In each of FIGS. 7 and 8, the surface temperature of the film reached a maximum value at the end of drying. Furthermore, in the period where the solvent content rate was not less than 2.0, the film surface temperature at the solvent content rate of 2.0 was the maximum value. The same applies to other examples (Examples 1 to 5 and 7 to 12, and Comparative Examples 2 to 4).

In Examples 1 to 5 and 7 to 11 in FIG. 6, desirable results showing little "image deformation" ("Excellent" or "Good" verdict) were obtained. In these Examples, the relationship $T(\alpha=2.0)<MFT+20°$ C. was established. In Examples 6 and 12, slight "image deformation" occurred, but of an acceptable amount ("Fair" verdict). In these Examples, the relationship $T(\alpha=2.0)=MFT+20°$ C. was established. In Comparative Examples 1 and 4, there was significant "image deformation" in all cases, which was judged to be of an unacceptable level ("Poor" verdict). In these Comparative Examples, the relationship $T(\alpha=2.0)>MFT+20°$ C. was established.

Due to the very close relationship between the film surface temperature T, the minimum film forming temperature MFT and "image deformation", it is deduced that image deformation is caused by the formation of a film (fusion) of the thermoplastic resin particles; however, image deformation does not necessarily occur when the film surface temperature T is equal to MFT, but rather there is a margin of approximately 20° C. Here, the ink film contains the solvent, and therefore it is deduced that the film formation of the thermoplastic resin particles occurs with a delay in comparison with the dried state.

Hence, it can be seen that desirable results with little image deformation are obtained when the ink film is heated and dried under conditions where $T<MFT+20°$ C. while the solvent content rate $\alpha\geqq2.0$.

In Examples 3 to 6 and 8 to 12, desirable results of high "image luster" ("Good" verdict) were obtained. In these examples, it is deduced that since the surface temperature T of the film reached MFT or higher by the end of drying, then a film of thermoplastic resin particles was formed, thus producing a smooth ink film and increasing the luster.

FIG. 9 shows a table of the results of evaluation experiments carried out when the treatment liquid film was not dried after depositing the treatment liquid.

In Examples 13 to 17 in FIG. 9, the results were obtained slightly inferior in terms of "image deformation" compared to Examples 2 to 6, but in all cases, the results were within an acceptable range. If drying of the treatment liquid is not carried out before depositing droplets of the ink, it is deduced that the interposition of the solvent at the surface of the base material when the ink droplets are deposited is a cause of slight decline in the adhesiveness between the base material and the coloring material. Furthermore, if the solvent in the treatment liquid remained on the surface of the ink film, this resulted in a slightly longer drying duration of the ink.

FIG. 10 shows a table of the results of evaluation experiments carried out when the ink drying was divided into two stages.

In Examples 18 to 21 in FIG. 10, the heating temperature in the latter part of drying was increased actively, comparison with the earlier part of the drying. More specifically, control was implemented in such a manner that the heating temperature and the air flow temperature of the heater were as stated in the "Ink drying" column in the table.

The evaluation results in Examples 18 to 21 were very desirable in terms of "image deformation" and "image luster". In other words, it is possible to combine avoidance of the image deformation and obtainment of the image luster, by setting the film surface temperature T during the earlier part of the drying to a low temperature and setting the film surface temperature T during the latter part of the drying to a high temperature.

Figure 11:
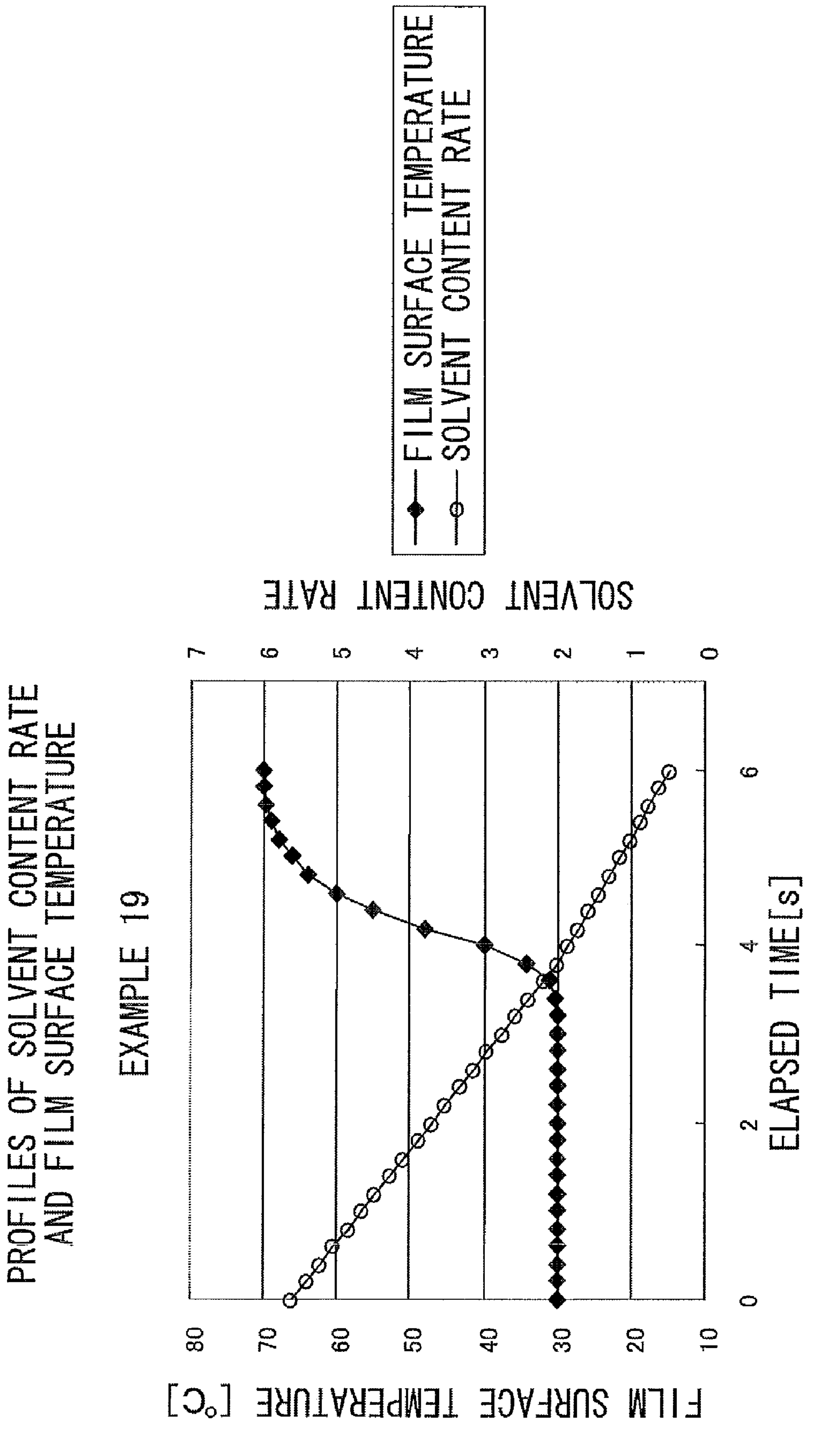
FIG. 11 is a graph showing profiles of a solvent content rate and film surface temperature in Example 19.

FIG. 11 shows a graph of the film surface temperature and the solvent content rate in Example 19 as the typical profile.

From the viewpoint of shortening the drying duration, it is desirable that the surface temperature T of the ink film is made as high as possible. Consequently, while the solvent content rate $\alpha \geqq 2.0$, heating and drying is carried out at conditions of $MFT \leqq T < MFT+20°$ C., and while the solvent content rate $\alpha < 2.0$, the surface temperature T of the ink film is increased, thereby shortening the drying duration as well as yielding desirable results showing little image deformation.

FIG. 12 shows a table of the results of evaluation experiments, comparing cases where the heat and pressure fixing was not carried out after the ink drying (Examples 4 and 10 described above) and cases where the heat and pressure fixing was carried out (Examples 22 and 23).

In the heat and pressure fixing in Examples 22 and 23, the heating roller was adjusted to a temperature of 80° C. and the ink film on the medium was pressed at a pressure of 1.2 MPa. The heating roller was a rotating body made of a metal material (metal roller) having a diameter of 40 mm, coated with silicone rubber of 1 mm thickness and having a smooth surface (smooth rubber roller).

Examples 22 and 23 were able to obtain even more desirable results ("Excellent" verdict) in respect of "image luster" in comparison with Examples 4 and 10. This is thought to be because the luster is increased due to the smoothing of the surface of the ink surface as a result of the heat and pressure fixing carried out by the smooth rubber roller.

Image Forming Apparatus According to Another Embodiment

Figure 13:
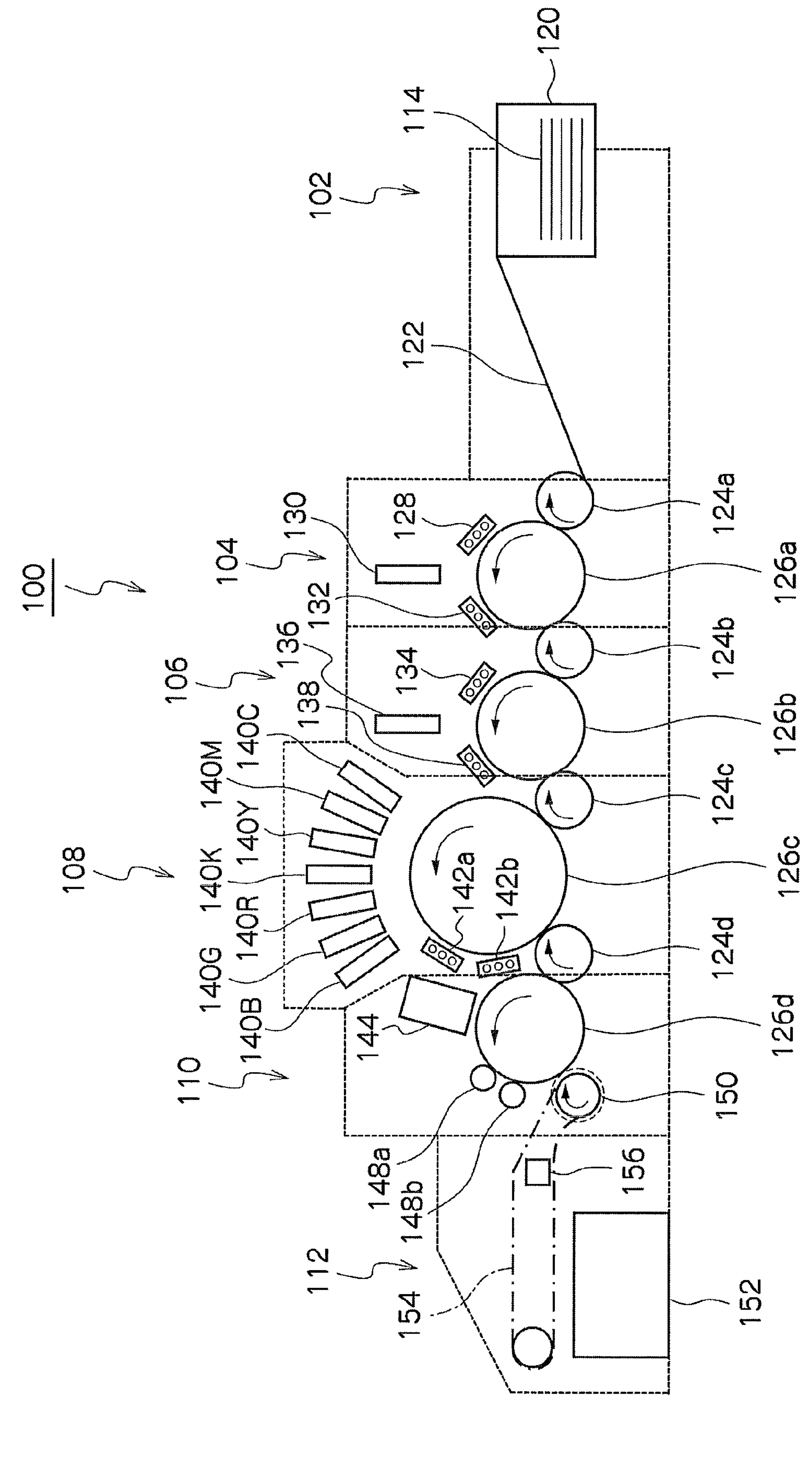
FIG. 13 is a general schematic drawing of an inkjet recording apparatus to which the image forming apparatus according to an embodiment of the present invention is applied.
Figure 14A:
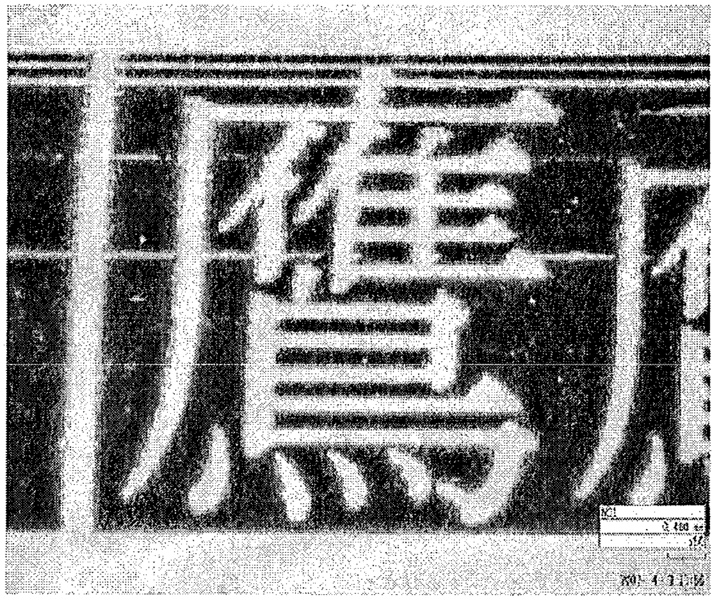
FIG.14A RELATED ART
FIGS. 14A and 14B are illustrative diagrams used to describe image deformation in the related art.
Figure 14B:
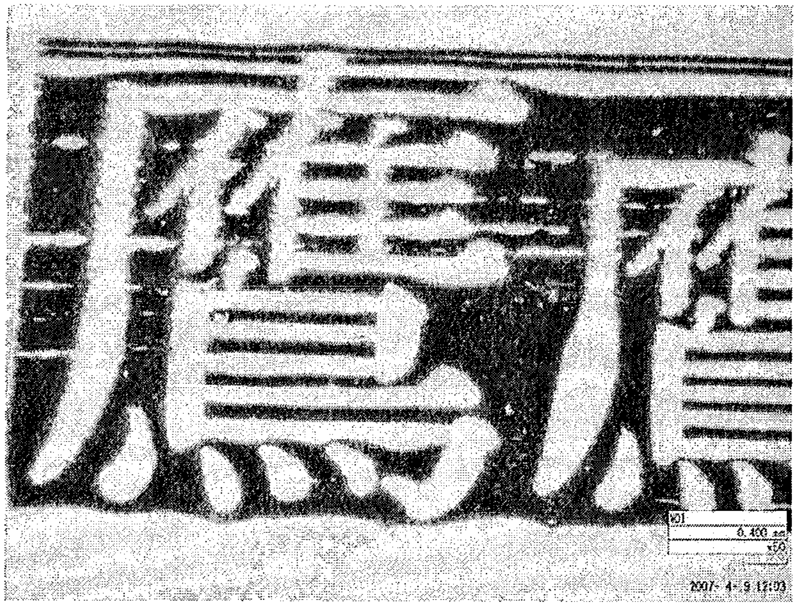
FIG.14B RELATED ART

FIG. 13 is a general schematic drawing showing an inkjet recording apparatus as an image forming apparatus according to an embodiment of the present invention. The inkjet recording apparatus 100 shown in FIG. 9 is a recoding apparatus that employs a two-liquid system using ink and treatment liquid to form an image on a recording medium 114.

The inkjet recording apparatus 100 includes: a paper supply unit 102, which supplies the recording medium 114; a permeation suppressing agent deposition unit 104, which deposits a permeation suppressing agent onto the recording medium 114; a treatment liquid deposition unit 106, which deposits a treatment liquid onto the recording medium 114; an ink droplet ejection unit 108, which ejects and deposits the colored inks onto the recording medium 114; a fixing unit 110, which fixes the image formed on the recording medium 114; and a paper output unit 112, which conveys and outputs the recording medium 114 on which the image has been formed.

A paper supply platform 120 on which the recording media 114 are stacked is provided in the paper supply unit 102. A feeder board 122 is connected to the front (the left-hand side in FIG. 13) of the paper supply platform 120, and the recording media 114 stacked on the paper supply platform 120 are supplied one sheet at a time, successively from the uppermost sheet, to the feeder board 122. The recording medium 114 that has been conveyed to the feeder board 122 is transferred through a transfer drum 124*a* to a pressure drum (permeation suppressing agent drum) 126*a* of the permeation suppressing agent deposition unit 104.

Although not shown in the drawings, holding hooks (grippers) for holding the leading edge of the recording medium 114 are formed on the surface (circumferential surface) of the pressure drum 126*a*, and the recording medium 114 that has been transferred to the pressure drum 126*a* from the transfer drum 124*a* is conveyed in the direction of rotation (the counter-clockwise direction in FIG. 13) of the pressure drum 126*a* in a state where the leading edge is held by the holding hooks and the medium adheres tightly to the surface of the pressure drum 126*a* (in other words, in a state where the medium is wrapped about the pressure drum 126*a*). A similar composition is also employed for the other pressure drums 126*b*, 126*c* and 126*d*, which are described hereinafter.

The permeation suppressing agent deposition unit 104 is provided with a paper preheating unit 128, a permeation suppressing agent ejection head 130 and a permeation suppressing agent drying unit 132 at positions opposing the surface of the pressure drum 126*a*, in this order from the upstream side in terms of the direction of rotation of the pressure drum 126*a* (the counter-clockwise direction in FIG. 13).

Each of the paper preheating unit 128 and the permeation suppressing agent drying unit 132 is provided with a hot air drying device blowing hot air of which the temperature and flow rate can be controlled within a prescribed range. When the recording medium 114 held on the pressure drum 126*a* passes through the positions opposing the paper preheating unit 128 and the permeation suppressing agent drying unit 132, the hot air heated by the hot air drying devices is blown onto the surface of the recording medium 114.

The permeation suppressing agent ejection head 130 ejects and deposits droplets of a solution containing the permeation suppressing agent (hereinafter referred to simply as the "permeation suppressing agent") onto the recording medium 114 held on the pressure drum 126*a*. In the present embodiment, the droplet ejection method is employed for depositing the permeation suppressing agent onto the surface of the recording medium 114; however, the deposition method is not limited to this, and for example, it is also possible to employ a roller application method, spray method, or the like.

The permeation suppressing agent suppresses the permeation into the recording medium 114 of the solvent (and compatible organic solvent) contained in the treatment liquid and the ink liquid described hereinafter. For the permeation suppressing agent, resin particles dispersed (or dissolved) in a solution are used. An organic solvent or water, for example, is used as the solvent for the permeation suppressing agent solution. As an organic solvent for the permeation suppressing agent, it is possible to use methyl ethyl ketone, a petroleum material, or the like.

The paper preheating unit 128 heats the recording medium 114 to have the temperature T1 above the minimum film forming temperature Tf1 of the resin particles of the permeation suppressing agent. The differential between Tf1 and T1 is desirably 10 to 20° C.

The method of adjusting the temperature T1 may employ, for instance: a method which heats the recording medium 114 from the lower surface by using a heat radiating body, such as a heater disposed inside the pressure drum 126_a_; a method which heats the recording medium 114 by directing a hot air flow onto the upper surface of the recording medium 114; and a method which heats the recording medium 114 from the upper surface of the recording medium 114 by using an infrared heater, or the like. Furthermore, it is also possible to combine these methods in an appropriate fashion.

It is suitable to use droplet ejection, spray application, roller application, or the like, as the method for depositing the permeation suppressing agent. In the case of droplet ejection, it is possible to deposit permeation suppressing agent selectively onto the ink droplet deposition areas and the periphery thereof, only.

Furthermore, in the case of a recording medium 114 that is not liable to produce curl, it is possible to omit the deposition of the permeation suppressing agent.

The treatment liquid deposition unit 106 is arranged after the permeation suppressing agent deposition unit 104. A transfer drum 124_b_ is arranged between the pressure drum (permeation suppressing agent drum) 126_a_ of the permeation suppressing agent deposition unit 104 and a pressure drum (treatment liquid drum) 126_b_ of the treatment liquid deposition unit 106, so as to make contact with same. Hence, after the permeation suppressing agent is deposited on the recording medium 114 that is held on the pressure drum 126_a_ of the permeation suppressing agent deposition unit 104, the recording medium 114 is transferred through the transfer drum 124_b_ to the pressure drum 126_b_ of the treatment liquid deposition unit 106.

The treatment liquid deposition unit 106 is provided with a paper preheating unit 134, a treatment liquid ejection head 136 and a treatment liquid drying unit 138 at positions opposing the surface of the pressure drum 126_b_, in this order from the upstream side in terms of the direction of rotation of the pressure drum 126_b_ (the counter-clockwise direction in FIG. 13).

The paper preheating unit 134 uses similar compositions to the above-described paper preheating unit 128 of the permeation suppressing agent deposition unit 104, and detailed descriptions are omitted here. Of course, it is also possible to employ different compositions to the paper preheating unit 128.

The treatment liquid ejection head 136 ejects droplets of the treatment liquid onto the recording medium 114 that is held on the pressure drum 126_b_. The treatment liquid ejection head 136 adopts the same composition as ink heads 140C, 140M, 140Y, 140K, 140R, 140G and 140B of the ink deposition unit 108, which is described below.

The treatment liquid used in the present embodiment has the action of aggregating the coloring materials contained in the inks that are ejected onto the recording medium 114 respectively from the ink heads 140C, 140M, 140Y, 140K, 140R, 140G and 140B disposed in the ink deposition unit 108, which is arranged at a downstream stage.

The treatment liquid drying unit 138 is provided with a hot air drying device blowing hot air of which the temperature and flow rate can be controlled within a prescribed range, thereby achieving a composition where the hot air heated by the hot air drying device is blown onto the treatment liquid on the recording medium 114 when the recording medium 114 that is held on the pressure drum 126_b_ passes the position opposing the hot air drying device of the treatment liquid drying unit 138. In the present embodiment, the treatment liquid is dried by means of the hot air of 80° C.

The temperature and flow rate of the hot air drying device are set to values whereby the treatment liquid having been deposited on the recording medium 114 by the treatment liquid ejection head 136 disposed to the upstream side in terms of the direction of rotation of the pressure drum 126_b_ is dried so that the solid or semi-solid aggregating treatment agent layer (the thin film layer of dried treatment liquid) is formed on the surface of the recording medium 114.

It is desirable that the recording medium 114 is preheated by the paper preheating unit 134, before depositing the treatment liquid on the recording medium 114, as in the present embodiment. In this case, it is possible to restrict the heating energy required to dry the treatment liquid to a low level, and therefore energy savings can be made.

The ink deposition unit 108 is arranged after the treatment liquid deposition unit 106. A transfer drum 124_c_ is arranged between the pressure drum (treatment liquid drum) 126_b_ of the treatment liquid deposition unit 106 and a pressure drum (print drum) 126_c_ of the ink deposition unit (image forming drum) 108, so as to make contact with same. Hence, after the treatment liquid is deposited and the solid or semi-solid aggregating treatment agent layer is formed on the recording medium 114 that is held on the pressure drum 126_b_ of the treatment liquid deposition unit 106, the recording medium 114 is transferred through the transfer drum 124_c_ to the pressure drum 126_c_ of the ink deposition unit 108.

The ink deposition unit 108 is provided with ink ejection heads 140C, 140M, 140Y, 140K, 140R, 140G and 140B, which correspond respectively to the seven colors of ink, C, M, Y, K, R, G and B, and solvent drying units 142_a_ and 142_b_ at positions opposing the surface of the pressure drum 126_c_, in this order from the upstream side in terms of the direction of rotation of the pressure drum 126_c_ (the counter-clockwise direction in FIG. 13).

The ink ejection heads 140C, 140M, 140Y, 140K, 140R, 140G and 140B employ the liquid ejection type recording heads (liquid ejection heads), similarly to the above-described treatment liquid ejection head 136. The ink ejection heads 140C, 140M, 140Y, 140K, 140R, 140G and 140B respectively eject droplets of corresponding colored inks onto the recording medium 114 held on the pressure drum 126_c_.

An ink storing and loading unit (not shown) is configured by ink tanks that store colored inks supplied to the ink ejection heads 140C, 140M, 140Y, 140K, 140R, 140G and 140B. Each ink tank communicates with a corresponding head through a required channel, and supplies the corresponding ink to the head. The ink storing and loading unit also includes a notification device (display device, alarm sound generator) such that when the residual amount of ink is small, the user is notified to this effect. In addition, the ink storing and loading unit includes a mechanism preventing the erroneous loading of colored inks.

The colored inks are supplied to the ink ejection heads 140C, 140M, 140Y, 140K, 140R, 140G and 140B from the tanks of the ink storing and loading unit, and droplets of the colored inks are ejected and deposited to the recording medium 114 by the ink ejection heads 140C, 140M, 140Y, 140K, 140R, 140G and 140B in accordance with the image signal.

Each of the ink ejection heads 140C, 140M, 140Y, 140K, 140R, 140G and 140B is a full-line head having a length corresponding to the maximum width of the image forming region of the recording medium 114 held on the pressure drum 126*c*, and having a plurality of nozzles (not shown) for ejecting the ink, which are arranged on the ink ejection surface of the head through the full width of the image forming region. The ink ejection heads 140C, 140M, 140Y, 140K, 140R, 140G and 140B are arranged so as to extend in a direction that is perpendicular to the direction of rotation of the pressure drum 126*c* (the conveyance direction of the recording medium 114).

According to the composition in which the full line heads having the nozzle rows covering the full width of the image forming region of the recording medium 114 are provided respectively for the colors of ink, it is possible to record a primary image on the image forming region of the recording medium 114 by performing just one operation of moving the recording medium 114 and the ink ejection heads 140C, 140M, 140Y, 140K, 140R, 140G and 140B relatively with respect to each other (in other words, by one sub-scanning action). Therefore, it is possible to achieve a higher printing speed compared to a case that uses a serial (shuttle) type of head moving back and forth reciprocally in the main scanning direction, which is the direction perpendicular to the sub-scanning direction or the conveyance direction of the recording medium 114, and hence it is possible to improve the print productivity.

The inkjet recording apparatus 100 according to the present embodiment is able to record on recording media (recording paper) up to a maximum size of 720 mm×520 mm and hence a drum having a diameter of 810 mm corresponding to the recording medium width of 720 mm is used for the pressure drum (print drum) 126*c*. The drum rotation peripheral speed when depositing the ink droplets is 530 mm/sec. The ink ejection volume of the ink ejection heads 140C, 140M, 140Y, 140K, 140R, 140G and 140B is 2 μl, and the recording density is 1200 dpi in both the main scanning direction (the breadthways direction of the recording medium 114) and the sub-scanning direction (the conveyance direction of the recording medium 114).

Although the configuration with the seven colors of C, M, Y, K, R, G and B is described in the present embodiment, the combinations of the ink colors and the number of colors are not limited to those. Light and/or dark inks, and special color inks can be added as required. For example, a configuration is possible in which ink heads for ejecting light-colored inks, such as light cyan and light magenta, are added. Furthermore, there is no particular restriction on the arrangement sequence of the heads of the respective colors.

Each of the solvent drying units 142*a* and 142*b* has a composition provided with a hot air drying device blowing hot air of which the temperature and flow rate can be controlled within a prescribed range, similarly to the paper preheating units 128 and 134, the permeation suppressing agent drying unit 132, and the treatment liquid drying unit 138, which have been described above. As described hereinafter, when ink droplets are deposited onto the solid or semi-solid aggregating treatment agent layer, which has been formed on the recording medium 114, an ink aggregate (coloring material aggregate) is formed on the recording medium 114, and furthermore, the ink solvent that has separated from the coloring material spreads, so that a liquid layer containing dissolved aggregating treatment agent is formed. The solvent component (liquid component) left on the recording medium 114 in this way is a cause of curling of the recording medium 114 and also leads to deterioration of the image. Therefore, in the present embodiment, after depositing the droplets of the colored inks from the ink ejection heads 140C, 140M, 140Y, 140K, 140R, 140G and 140B onto the recording medium 114, the hot air drying devices of the solvent drying units 142*a* and 142*b* blow the hot air of 70° C. onto the recording medium 114 so that the solvent component is evaporated off and the recording medium 114 is dried.

The fixing unit 110 is arranged after the ink deposition unit 108. A transfer drum 124*d* is arranged between the pressure drum (print drum) 126*c* of the ink deposition unit 108 and a pressure drum (fixing drum) 126*d* of the fixing unit 110, so as to make contact with same. Hence, after the colored inks are deposited on the recording medium 114 that is held on the pressure drum 126*c* of the ink deposition unit 108, the recording medium 114 is transferred through the transfer drum 124*d* to the pressure drum 126*d* of the fixing unit 110.

The fixing unit 110 is provided with a print determination unit 144, which reads in the print results of the ink deposition unit 108, and heating rollers 148*a* and 148*b* at positions opposing the surface of the pressure drum 126*d*, in this order from the upstream side in terms of the direction of rotation of the pressure drum 126*d* (the counter-clockwise direction in FIG. 13).

The print determination unit 144 includes an image sensor (a line sensor, or the like), which captures an image of the print result of the ink deposition unit 108 (the droplet ejection results of the ink ejection heads 140C, 140M, 140Y, 140K, 140R, 140G and 140B), and functions as a device for checking for nozzle blockages and other ejection defects, on the basis of the droplet ejection image captured through the image sensor.

The heating rollers 148*a* and 148*b* are rollers of which temperature can be controlled in a prescribed range (e.g., 100° C. to 180° C.), and the image formed on the recording medium 114 is fixed while nipping the recording medium 114 between the pressure drum 126*c* and each of the heating rollers 148*a* and 148*b* to heat and press the recording medium 114. In the present embodiment, the heating temperature of the heating rollers 148*a* and 148*b* is 110° C. and the surface temperature of the pressure drum 126*d* is set to 60° C. Furthermore, the nip pressure of the heating rollers 148*a* and 148*b* is 1 MPa. Desirably, the heating temperature of the heating rollers 148*a* and 148*b* is set in accordance with the glass transition temperature of the polymer particles contained in the treatment liquid or the ink.

The paper output unit 112 is arranged after the fixing unit 110. The paper output unit 112 is provided with a paper output drum 150, which receives the recording medium 114 on which the image has been fixed, a paper output platform 152, on which the recording media 114 are stacked, and a paper output chain 154 having a plurality of paper output grippers, which is spanned between a sprocket arranged on the paper output drum 150 and a sprocket arranged above the paper output platform 152.

The drying of the treatment liquid film is described below in detail.

In the inkjet recording apparatus 100 shown in FIG. 13, the recording medium 114 that has passed the treatment liquid ejection head 136 is firstly heated and dried by the hot air flow of the treatment liquid drying unit 138 and is then heated and dried by the transfer drum 124*c*. Thereby, a solid or semi-solid treatment liquid film (aggregating treatment agent layer) is formed on the recording medium 114.

The "solid or semi-solid aggregating treatment agent layer" includes a layer having a solvent content rate of 0% to 70%, where the solvent content rate is defined as: "Solvent content rate"="Weight of solvent contained in treatment liquid after drying, per unit surface area ($g/m^2$)"/"Weight of treatment liquid after drying, per unit surface area ($g/m^2$)".

It should be noted that this differs from the definition of the solvent content rate in the ink film described above. Here, the "unit surface area" is the unit surface area of the contact interface between the treatment liquid film and the recording medium 114. Furthermore, "semi-solid" is used as a broad concept that also includes liquid states, provided that they satisfy the above-described definition.

As regards the method of measuring the solvent content rate of the treatment liquid film, a sheet of paper having a size of 100 mm×100 mm is cut out, the total weight of the paper after the deposition of the treatment liquid (before drying) (i.e., the total weight of the paper and the deposited treatment liquid before drying) and the total weight of the paper after drying of the treatment liquid (the total weight of the paper and the deposited and dried treatment liquid) are measured, and the difference between the total weights is calculated, thereby determining the weight of the solvent after drying. Furthermore, the amount of solvent contained in the treatment liquid before drying is calculated from the method of preparing the treatment liquid.

In cases where the treatment liquid is deposited before droplets of the ink are deposited, if the ink droplets land on the liquid layer of the treatment liquid (treatment liquid film), the ink droplets (coloring material) float (move about) in the treatment liquid film when the ink aggregates, and in cases where high image quality is pursued, it is found that image quality becomes worse. In order to prevent floating (movement) of the coloring material of the ink in the treatment liquid film, it is found to be effective to render the treatment liquid film to a solid or semi-solid state by drying and evaporating off the treatment liquid film before the deposition of the ink droplets after the deposition of the treatment liquid. As a result of evaluating this with respect to the solvent content rate in the treatment liquid film, as shown in Table 1 below, it was found that dot movement caused by floating of the coloring material of the ink become inconspicuous if the treatment liquid film was dried to a solid or semi-solid state by evaporating off the solvent to the solvent content rate of 70% or lower, and furthermore, movement of the coloring material assumed a satisfactory level that was imperceptible by visual inspection when the treatment liquid was dried until the solvent content rate of 50% or lower. Thus, experimental results which showed that image deterioration can be prevented were obtained.

TABLE 1

| | Experiment 1 | Experiment 2 | Experiment 3 | Experiment 4 | Experiment 5 |
|---|---|---|---|---|---|
| Drying step | No | Yes | Yes | Yes | Yes |
| Total weight ($g/m^2$) | 10.0 | 6.0 | 4.0 | 3.0 | 1.3 |
| Weight of water ($g/m^2$) | 8.7 | 4.7 | 2.7 | 1.5 | 0 |
| Solvent content rate (%) | 87 | 78 | 67 | 50 | 0 |
| Movement of coloring material | Poor (defective) | Fair (slight movement) | Good (inconspicuous movement) | Excellent | Excellent |

As shown in Table 1, when the treatment liquid was not dried (Experiment 1), then image deterioration occurred due to movement of the coloring material.

On the other hand, when drying of the treatment liquid was carried out (Experiments 2 to 5), then the movement of the coloring material was inconspicuous when the treatment liquid was dried until the solvent content rate in the treatment liquid of 70% or lower, and the movement of the coloring material assumed a satisfactory level that was imperceptible by visual inspection when the treatment liquid was dried until the solvent content rate of 50% or lower. Thus, it was confirmed that the drying of the treatment liquid was effective in preventing image deterioration.

In this way, by heating and drying the treatment liquid film (the aggregated treatment liquid layer) on the recording medium 12 until the solvent content rate thereof is 70% or lower (and desirably 50% or lower), and thereby forming the solid or semi-solid treatment liquid film on the recording medium 114, it is possible to prevent image deterioration caused by movement of coloring material, and therefore an image of high quality can be obtained.

The method of preparing the latex used as the permeation suppressing agent is described below.

A mixed solution was prepared by mixing 10 g of a dispersion stabilizer resin (Q-1) having the following structure:

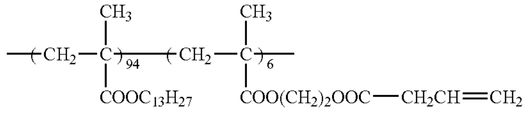

$\overline{M}w=4\times10^4$ (weight composition ratio), 100 g of vinyl acetate and 384 g of Isopar H (Exxon), and was heated to a temperature of 70° C. while being agitated in a nitrogen gas flow. Then, 0.8 g of 2,2'-azobis(isovaleronitrile) (A.I.V.N.) was added as a polymerization initiator, and the mixture was made react for 3 hours. 20 minutes after adding the polymerization initiator, white turbidity was produced and the reaction temperature rose to 88° C. A further 0.5 g of polymerization initiator was added and after making reaction for 2 hours, the temperature was raised to 100° C. and the mixture was agitated for 2 hours. Then, vinyl acetate that had not reacted was removed. The mixture was cooled and then passed through a 200-mesh nylon cloth. The white dispersed material thereby obtained was a latex having a polymerization rate of 90%, an average particle size of 0.23 μm and good monodisperse properties. The particle size was measured with a Horiba CAPA-500.

A portion of the white dispersed material was placed in a centrifuge (for example, rotational speed: $1\times10^4$ r.p.m.; operating duration: 60 minutes), and the precipitated resin particles were complemented and dried. The weight-average molecular weight (Mw), glass transition point (Tg) and minimum film forming temperature (MFT) of the resin particles were measured as follows: Mw was $2\times10^5$ (GPC value converted to value for polystyrene), Tg was 38° C. and MFT was 28° C.

The white dispersed material prepared as described above is deposited onto the recording medium as the permeation suppressing agent. During deposition, the recording medium is heated by the drum, for example, and after the deposition, the Isopar H is evaporated off by blowing a hot air flow.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming method of forming an image on a medium by using ink and treatment liquid, the ink containing coloring material and thermoplastic resin particles in a solvent, the treatment liquid containing a component which aggregates the coloring material, the method comprising:

a treatment liquid deposition step of depositing the treatment liquid onto the medium to form a treatment liquid film on the medium;

an ink droplet deposition step of ejecting and depositing droplets of the ink onto the medium to form an ink film on the medium on which the treatment liquid film has been formed; and an ink film drying step of heating and drying the ink film under conditions where $T<MFT$ until $\alpha$ declines to a state not higher than 2.0 from a state exceeding 2.0, where T is a surface temperature of the ink film, MFT is a minimum film forming temperature of the thermoplastic resin particles, and $\alpha$ is a solvent content rate of the ink film formed on the medium in the ink droplet deposition step defined as a volume of the solvent per unit surface area in the ink film divided by a volume of solid material per unit surface area in the ink film.

2. The image forming method as defined in claim 1, further comprising a treatment liquid film drying step of heating and drying the treatment liquid film on the medium formed in the treatment liquid deposition step, after carrying out the treatment liquid deposition step and before carrying out the ink droplet deposition step.

3. The image forming method as defined in claim 1, wherein, in the ink film drying step, the heating and drying are carried out by setting the film surface temperature T to be not lower than MFT by a time of completion of the heating and drying of the ink film after the solvent content rate $\alpha$ has become not higher than 2.0.

4. The image forming method as defined in claim 1, wherein, in the ink film drying step, the heating and drying are carried out by raising the film surface temperature T after the solvent content rate $\alpha$ has become not higher than 2.0.

5. The image forming method as defined in claim 1, further comprising a fixing step of pressing and fixing the ink film onto the medium by means of a heated member, after carrying out the ink film drying step.

6. An image forming apparatus which forms an image on a medium by using ink and treatment liquid, the ink containing coloring material and thermoplastic resin particles in a solvent, the treatment liquid containing a component which aggregates the coloring material, the apparatus comprising:

a treatment liquid deposition device which deposits the treatment liquid onto the medium to form a treatment liquid film on the medium;

an ink droplet ejection device which ejects and deposits droplets of the ink onto the medium to form an ink film on the medium on which the treatment liquid film has been formed; and an ink film drying device which heats and dries the ink film under conditions where $T<MFT$ until $\alpha$ declines to a state not higher than 2.0 from a state exceeding 2.0, where T is a surface temperature of the ink film, MFT is a minimum film forming temperature of the thermoplastic resin particles, and $\alpha$ is a solvent content rate of the ink film formed on the medium by the ink droplet deposition device defined as a volume of the solvent per unit surface area in the ink film divided by a volume of solid material per unit surface area in the ink film.

* * * * *